(12) United States Patent
Skillman

(10) Patent No.: US 8,525,794 B2
(45) Date of Patent: Sep. 3, 2013

(54) DEVICE AND TECHNIQUE FOR ASSIGNING DIFFERENT INPUTS TO KEYS ON A KEYPAD

(75) Inventor: Peter Skillman, San Carlos, CA (US)

(73) Assignee: Palm, Inc., Sunnyvale, CA (US)

( * ) Notice: Subject to any disclaimer, the term of this patent is extended or adjusted under 35 U.S.C. 154(b) by 670 days.

(21) Appl. No.: 12/395,535

(22) Filed: Feb. 27, 2009

(65) Prior Publication Data

US 2009/0295605 A1 Dec. 3, 2009

Related U.S. Application Data

(63) Continuation of application No. 11/114,908, filed on Apr. 25, 2005, now Pat. No. 7,511,700, which is a continuation-in-part of application No. 11/080,375, filed on Mar. 14, 2005.

(51) Int. Cl.
*G06F 3/02* (2006.01)

(52) U.S. Cl.
USPC .................. 345/169; 345/156; 345/168

(58) Field of Classification Search
USPC .................. 345/159–184; 341/22
See application file for complete search history.

(56) References Cited

U.S. PATENT DOCUMENTS

| | | | | |
|---|---|---|---|---|
| 5,236,199 A | * | 8/1993 | Thompson, Jr. | 463/41 |
| 5,973,621 A | * | 10/1999 | Levy | 341/22 |
| 6,348,878 B1 | * | 2/2002 | Tsubai | 341/23 |
| 6,377,685 B1 | * | 4/2002 | Krishnan | 379/433.07 |
| 6,950,988 B1 | * | 9/2005 | Hawkins et al. | 715/700 |
| 7,206,599 B2 | * | 4/2007 | Lemley | 455/550.1 |
| 7,216,588 B2 | * | 5/2007 | Suess | 101/486 |
| 7,265,745 B1 | * | 9/2007 | Kling | 345/169 |
| 7,502,462 B2 | * | 3/2009 | Rak et al. | 379/433.07 |

* cited by examiner

*Primary Examiner* — Christopher E Leiby

(57) ABSTRACT

Embodiments of the invention provide an effective keypad assembly and keypad layout for mobile computing devices. In particular, embodiments of the invention provide keyboard layouts and designs. Additionally, embodiments described herein provide for stack components to make keyboards operable on small-form factor devices.

16 Claims, 26 Drawing Sheets

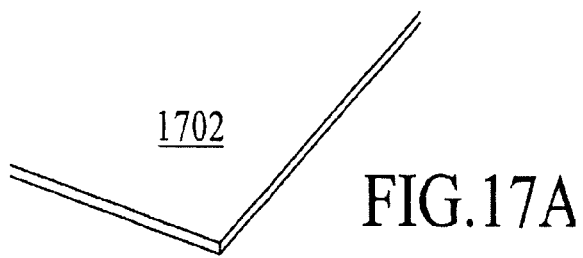
FIG.17A
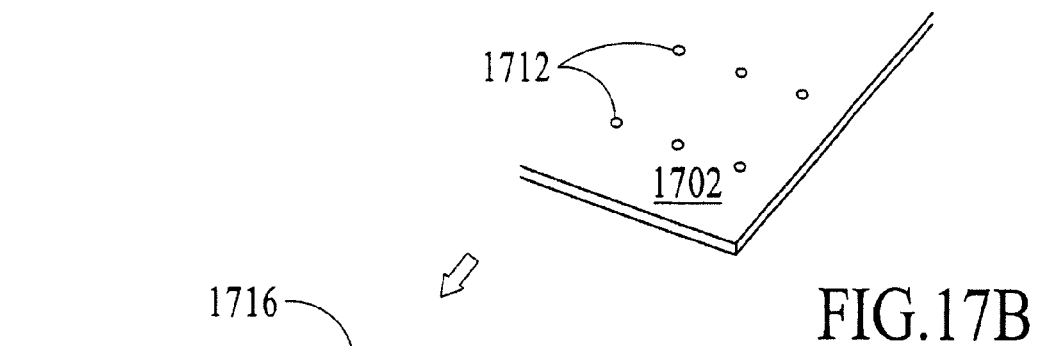
FIG.17B
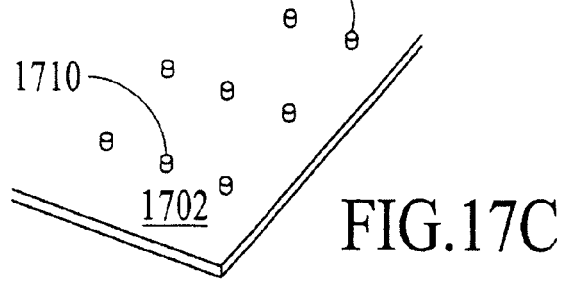
FIG.17C
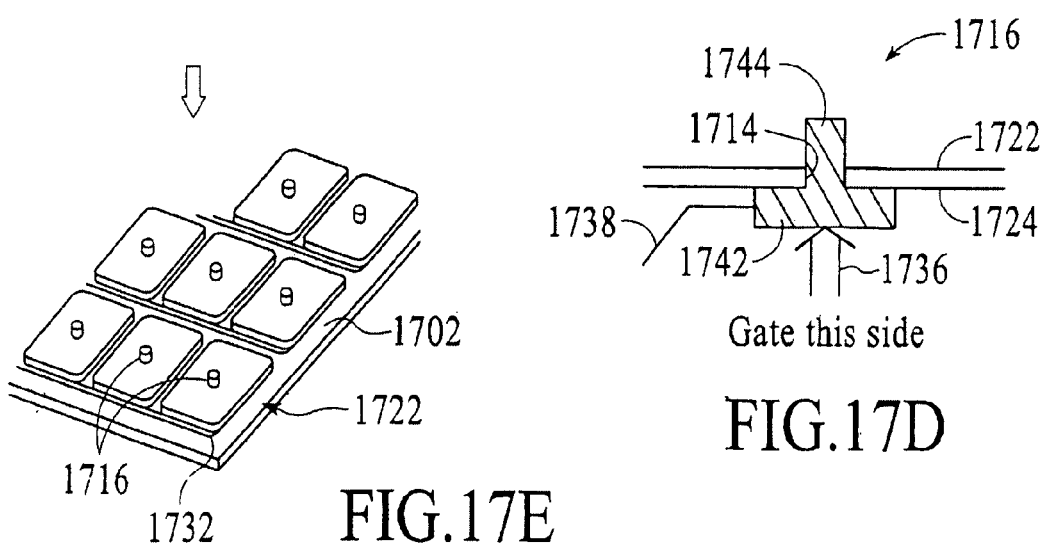
FIG.17D
FIG.17E

DEVICE AND TECHNIQUE FOR ASSIGNING DIFFERENT INPUTS TO KEYS ON A KEYPAD

RELATED APPLICATIONS

This application is a continuation of U.S. patent application Ser. No. 11/114,908, filed Apr. 25, 2005 now U.S. Pat. No. 7,511,700, entitled "Device and Technique for Assigning Different Inputs to Keys on a Keypad;" which is a continuation-in-part of U.S. patent application Ser. No. 11/080,375, filed Mar. 14, 2005, entitled "Stack Assembly For Implementing Keypads On Mobile Computing Devices." The aforementioned priority applications are hereby incorporated by reference for all purposes.

TECHNICAL FIELD

The disclosed embodiments relate generally to the field of keypads for mobile computing devices. In particular, the disclosed embodiments relate to a device and technique for assigning different inputs to keys on a keypad.

BACKGROUND

Over the last several years, the growth of cell phones and messaging devices has increased the need for keypads that are small and tightly spaced. In particular, QWERTY keypads have become smaller with greater key switch density. With decreasing overall size, there has been greater focus on efforts to make individual keys more usable to a user. For example, keyboard design considers how readily the user can select or click ("clickability") individual key structures of keyboard. The clickability may be affected by various factors, such as the individual key structure size and shape, as well as the spacing between key structures and the tactile response of individual key structures.

Other features that may affect usability include illumination of the keypad. Smaller keyboards tend to have smaller print patterns, and thus are more difficult to see. Some of the solutions provided for illuminating key pads includes using incandescent light sources and lighting areas surrounding individual key structures. The need for illumination becomes more important with small and/or tightly spaced key structures, because the smaller keys are more difficult to see. Furthermore, the smaller keyboards tend to be more unfamiliar to users who may be use to full-size keyboards, and many users have difficulty typing without seeing the individual key structures.

BRIEF DESCRIPTION OF THE DRAWINGS

FIGS. 17A-17E illustrate another technique for forming an actuation member layer, under another embodiment of the invention.

DETAILED DESCRIPTION

Overview

Figure 1:
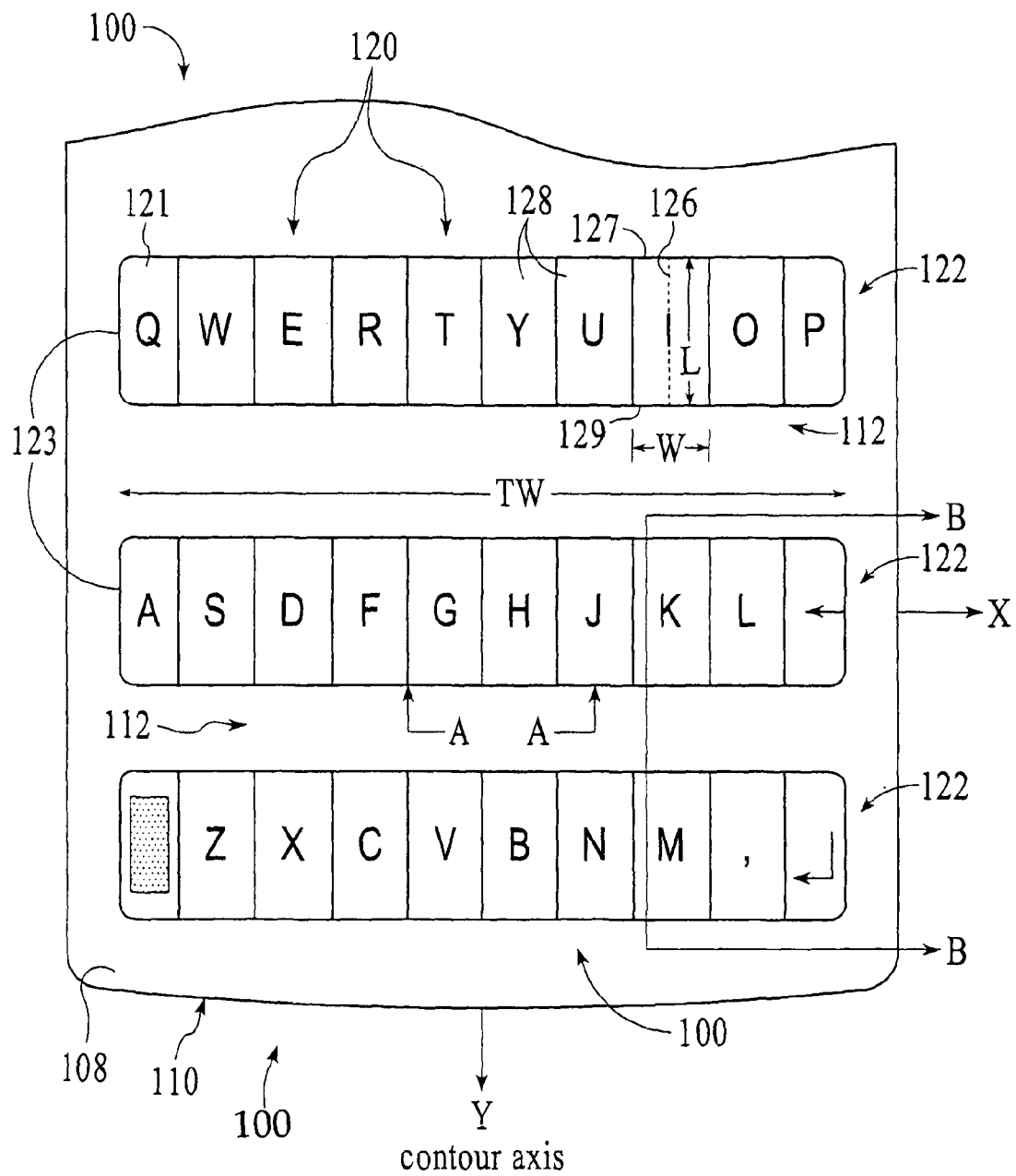
FIG. 1 illustrates a small-form factor keyboard for use with a mobile computing device, according to an embodiment of the invention.

Embodiments of the invention provide an effective keypad assembly and keypad layout for mobile computing devices. In particular, embodiments of the invention provide keyboard layouts and designs. Additionally, embodiments described herein provide for stack components to make keyboards operable on small-form factor devices.

According to one embodiment, a small form-factor keypad is provided that prioritizes available housing real-estate for the area occupied by individual keys. The result is larger keys and/or smaller sized mobile computing devices, at least compared to past approaches for placing keypads and keyboards on such devices.

In another embodiment, a modular stack assembly is provided for making small-form factor keyboards operable on mobile computing devices.

In still another embodiment, a technique and design is provided to facilitate users in making number entries on small form-factor keyboards.

While numerous embodiments and implementations are provided in this application, the embodiments described herein do not necessarily depend on one another. For example, under an embodiment, a mobile computing device may implement a keyboard design such as described with FIG. 1, but omit use of a stack assembly such as described by other embodiments of the invention. Numerous variations and implementations for embodiments of the invention are described in this application.

Keypad Design

Embodiments described herein provide a keyboard having keys that are tightly spaced in at least one direction (e.g. the horizontal direction). This promotes a small overall form factor for the mobile computing device and/or larger keys on the device. Several features and considerations are implemented with a keyboard design of one or more embodiments of the invention. These features and considerations include (i) a shape or footprint of individual keys that form the keypad, (ii) a spacing between adjacent and neighboring keys in the keypad (e.g. a horizontal spacing between adjacent keys of a row), and/or (iii) a spacing between adjacent sets of keys (e.g. a vertical spacing between rows of a keyboard). One result achieved by an embodiment of the invention is that a larger percentage of a housing surface can be used for the individual keys that comprise a keyboard of the mobile computing device. This enhances the usability of the keypad, particularly in the user's ability to see and select keys using finger tips and pointed objects.

According to an embodiment, a mobile computing device is provided having a housing on which a keypad is provided. The keypad may be formed from a plurality of key structures that extend from a surface or region of the housing. Individual key structures that form the keypad are moveable inward, so to move from an original position into an engaged position. When moved into the engaged position, processor(s) contained within the housing register an input, depending on the particular key structure that is engaged. A majority of the key structures have a footprint that is oblong in shape to define a length and a width of that key structure. The footprint is also symmetrical about at least its length. Each key structure in the majority includes an outer surface that is provided with an outward curvature relative to the region of the housing.

In an embodiment, the keypad is a keyboard, with each key structure being assignable to a particular letter and/or character. In one embodiment, key structures that form the keyboard that are most proximate to one another in a first direction (e.g. the horizontal direction) nearly abut one another. The key structures may also be distributed linearly in the first direction, so that a dimension of the keyboard in the first direction corresponds substantially to a sum of a dimension of the individual key structures in the first direction.

As used herein, the term "substantially" means nearly equal, or at least 80% of a stated quantity or expression. Similar relational expressions, such as "about" or "approximately" should be considered to be 90% or more of a stated quantity.

The expression "nearly abuts" means almost or nearly in contact. In the context of key structures of a mobile computing device, the expression "nearly abuts" means (i) two key structures are sufficiently separated to move independently; and (ii) the two key structures are proximate enough so that they appear to be in contact or abutting. Additional description and variations to the expression "nearly abutting" are provided below in this application.

In another embodiment, a keypad is provided for a mobile computing device. The keypad includes a plurality of key structures that are distributed to extend in a horizontal direction and in a vertical direction on a face of the mobile computing device. For at least a majority of the plurality of key structures, individual key structures that are most proximate to one another in the horizontal direction nearly abut one another, while key structures that are most proximate to one another in the vertical direction are spaced apart. Additionally, individual key structures in the majority of key structures have a footprint that is oblong.

In one variation, the lengthwise direction of the footprint for the majority of key structures corresponds to the vertical direction. Alternatively, the lengthwise direction of the footprint for the majority of key structures may be tilted about the vertical direction.

The expression "spaced-apart" means a spacing that is greater than what would appear to be abutting. Two key structures that are spaced apart may be separated by a visible underlying surface or layer.

Among other features provided by keyboard embodiments described herein, the individual key size of a keyboard on a mobile computing device is maximized, or at least enhanced relative to the form factor of the mobile computing device. In some embodiments, the key structures are elongated to have length in a vertical direction, while a limiting dimension (e.g. the width) of the mobile computing device is in the horizontal direction. The use of elongated keys having lengths in the non-limiting dimension of the mobile computing device enables the individual key structures to be made larger, without need to increase the dimensions of the mobile computing device. The larger key size enables larger graphics and tactile feedback for the user. For example, the user has more key area to locate and select keys using fingertips.

The use of elongated key structures that are aligned with the non-limiting dimension of the mobile computing device also permit for the key structures to be shaped in a manner that is conducive to the user's touch and use. For example, one embodiment provides for individual key structures that are barrel shaped, so as to contour outward in symmetrical fashion. The contoured shape and dimension of individual keys hinders inadvertent finger movements by the user that may result in inadvertent strikes to neighboring keys. Specifically, the contour shape provided enables the user to avoid finger slippage and to have a better feel for the key when making a key strike.

FIG. 1 illustrates a small-form factor keyboard for use with a mobile computing device, according to an embodiment of the invention. The keyboard 100 is provided on a surface 102 of housing 110 for a mobile computing device. An example of a mobile computing device for use with embodiments of the invention includes cell phones, messaging devices and/or cell phone combination devices(e.g. a HANDSPRING TREO device, manufactured by PALMONE, INC.), and personal digital assistants. The keyboard 100 includes a plurality of key structures 120 that are distributed to span in a horizontal direction (X) and a vertical direction (Y). In an example provided, the key structures 120 are provided in a QWERTY layout on the surface 102. As such, most (if not all) key structures 120 may be assigned a letter and possibly one or more alphanumeric characters, although some key structures may be assigned functions (e.g. Enter). The assignment of letters, functions (e.g. "Enter") and other alphanumeric characters, may be displayed with the key structure 120 through artwork or print. In an example provided by FIG. 1, 30 key structures 120 are provided to accommodate 26 letters and 4 special keys or functions, although more or fewer can be included in the keyboard 100. To accommodate a general QWERTY layout, an embodiment provides that the key structures 120 are distributed in at least three horizontal sets 122. In the example provided, the horizontal sets 122 are rows, or substantially linear in the horizontal direction (X). However, as described with other embodiments, the horizontal sets 122 may extend in the horizontal direction, while being staggered or arcuate (such as to form a "smile").

According to an embodiment, an overall horizontal dimension of each horizontal set 122 consists primarily of a sum of the horizontal dimensions of the individual key structures in that horizontal set. With reference to FIG. 1, an embodiment provides that a dimension of any horizontal set 122 represented by TW is substantially or approximately equal (e.g. within 90%) to a sum of a maximum width W of each key structure 120 in that horizontal set 122.

In FIG. 1, adjacent key structures 120 in each horizontal set 122 nearly abut one another. In an embodiment, the adjacent keys are nearly abutting if adjacent keys have the appearance of being abutting, when in fact individual each key structure 120 are separated from adjacent key structure that appear to be abutting. Adjacent key structures may appear to be abutting if no space or structure appears to separate the key structures. However, while the key structures may appear to be abutting, sufficient separation does exist between abutting key structures which enables any key structure to be moved inward independently and freely of adjacent key structures that appear to be abutting. Thus, inward movement by one key structure 120 key does not translate to the nearly abutting key structure. In an implementation where individual key structures are aligned to make contact with and direct actuation members into electrical contacts, a distance of separation for nearly abutting key structures corresponds to a distance that is of the order of a tolerance level for assembling the housing and interconnecting components or layers (excluding the actual keypad)) to make the keyboard effective. For example, in implementations described with FIGS. 11, 13A, 13B, 14A, 14B, 15A, and 15B, the tolerance level may be tied to individual tolerances for assembling a stack assembly comprising an actuation member layer, illumination layer, electrical contact layer and/or any other layer or element for the assembled and integrated stack. The tolerance level of the stack may comprise the sum tolerances provided by placement of each layer that forms the stack. According to embodiments, a separation distance between nearly abutting key structures is less than 0.6 mm, and more preferably, less than or equal to about 0.1 mm. In one implementation, a separation distance between nearly abutting key structures is about 0.05 mm.

While an embodiment such as described by FIG. 1 provides for nearly abutting key structures 120, it should be notes that other embodiments may provide for a greater separation between the adjacent key structures 120 of the horizontal sets 122. For example, the separation between adjacent key structures 120 of the horizontal sets 122 may range to about 0.60 mm to 0.75 mm, so that the key structures 120 are tightly spaced, but not necessarily nearly abutting. An example of such an embodiment is shown with FIGS. 4A and 4B.

In an embodiment of FIG. 1, adjacent horizontal sets 122 are separated from one another by strips 112 of housing 110, forming regions of the surface 102. As such, key structures 120 that are nearest or most proximate to one another in the vertical direction (Y) are spaced-apart. As described in FIG. 2B, individual key structures 120 may extend or be supported underneath the housing 110 in the vertical direction (Y), as the horizontal sets 122 are sufficiently spaced apart to provide for the housing strips 112. As described with an embodiment of FIG. 2B, sub-layer extensions may extend from each key structure 120, underneath the surface 108 and just under a top visible edge 127 and bottom visible edge 129 of that key structure. The sub-layer extensions hold in place on the housing the individual key structures and/or the keyboard (or portions thereof, depending on whether the key structures are provided on a carrier or carrier segments).

The layout of keyboard 100 as its spans the horizontal (X) and vertical (Y) directions may have several variations and alternatives. For example, while FIG. 1 illustrates each horizontal set 122 being aligned in the vertical direction, other implementations may stagger each horizontal set. Likewise, the horizontal sets 122 may be provided with less linearity, such as in a curved or "smiley face" configuration, or staggered at one or more locations.

In an embodiment shown by FIG. 1, individual key structures 120 are shaped to occupy a greater amount of area on surface 108 of housing 110. In one embodiment, a majority of the key structures 120 are each provided a footprint 128 that is oblong, and an exterior surface that has at least one outward curvature (see FIG. 2A and FIG. 2B). The footprint 128 corresponds to the two-dimensional space occupied by the key structure on the surface 108 of the housing 110. By being oblong, the footprint 128 of a particular key structure 120 (e.g. the letter "I") has a maximum length L that is greater than its maximum width W. In one embodiment, the footprint 128 is symmetrical about the lengthwise axis. For example, the particular shape of key structures on the interior of the keyboard is rectangular. Other oblong shapes for footprints of key structures are possible, such as elliptical or a rectangular/ellipse combination. In an embodiment shown, a lengthwise direction 126 of the footprint 128 for the majority of key structures 120 coincides with the vertical axis (Y) and the non-limiting dimension of the mobile computing device. In another embodiment, the lengthwise direction 120 of the footprint 128 for the key structures 120 may be tilted with reference to the vertical axis (Y).

Not all key structures may be provided with the oblong and/or symmetrical key structures. In an example provided by FIG. 1, boundary key structures 121, which are provided at the boundary of each horizontal set 122, may have a different shape than the other key structures in the keyboard. In one implementation, the boundary key structures 121 have the same length dimension, or shaped to be oblong, but are non-symmetrical. For example, a boundary side 123 of each boundary key structure 121 may be curved, rather than linear, so as to provide that key structure the non-symmetrical footprint. Furthermore, the keyboard 100 may include numerous other key structures, such as application keys, number keys, a space bar etc. Many of these key structures may have different shapes and orientations. According to an embodiment, a majority of the key structures of the keyboard are shaped to include the oblong footprint and the symmetry about the lengthwise axis 126. In an implementation shown, these key structures 120 are non-boundary key structures that are assigned letter values and more likely to be heavily used.

Figure 2A:
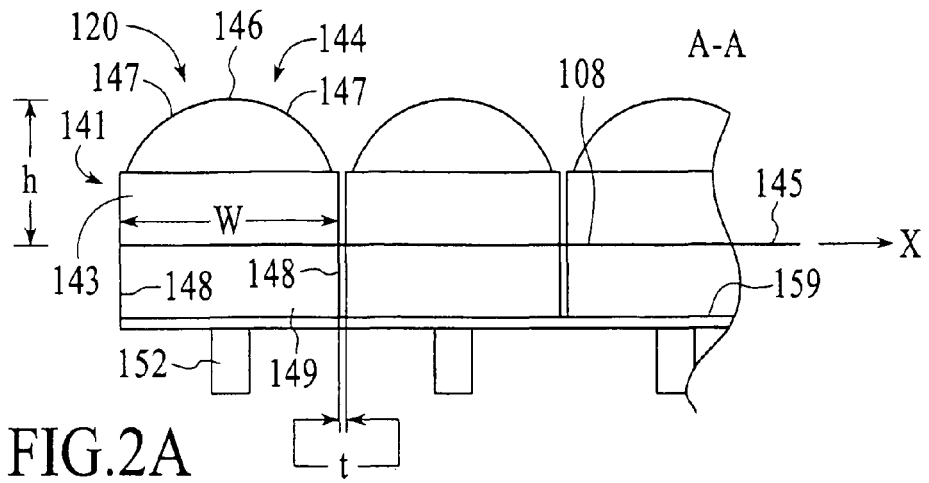
FIG. 2A is a side cross-sectional view along lines A-A of FIG. 1, according to an embodiment.
Figure 2B:
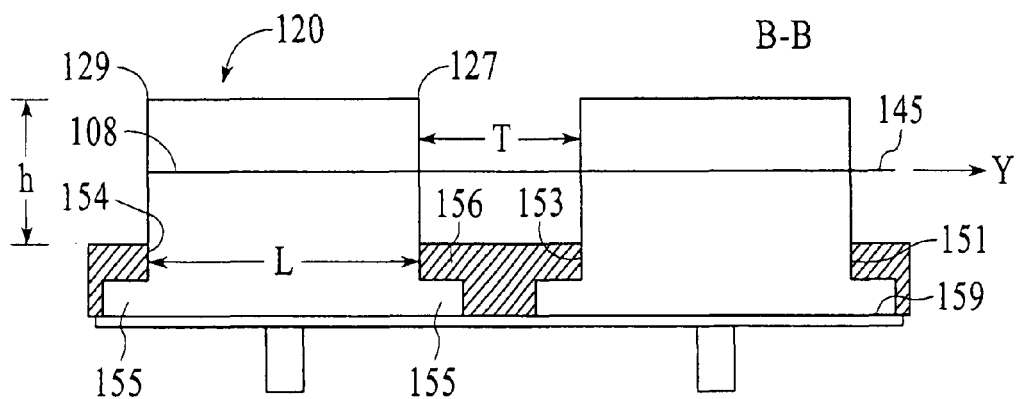
FIG. 2B is a side cross-sectional view along lines B-B of FIG. 1, according to an embodiment.

In addition to the footprint design, individual key structures 120 may be provided with an outward curvature on an exterior surface 144 (see FIG. 2A and FIG. 2B). When the thickness or height of the individual key structure is viewed, the exterior surface may be convex. As will be described, the outward curvature facilitates the user in making better key strikes, in part by providing a surface that hinders inadvertent finger slippage and movements. In one embodiment, individual key structures 120 (specifically, at least those with symmetrical and oblong footprints) are provided a curvature about one axis. In an embodiment, the curvature is provided about the lengthwise direction 126 of the individual keys, which in the example provided by FIG. 1, corresponds to the vertical axis (Y). As will be described, the curvature may be symmetrical, so as to coincide with a centerline of an individual key structure 120. A result is that the individual key structure 120 is "barrel shaped" so as to extend from surface 108 in the form of a partial cylinder.

FIGS. 2A and 2B are side cross-sectional views along respective lines A-A and B-B of FIG. 1, according to an embodiment. The cross-section of FIG. 2A illustrates adjacent key structures 120 of one of the horizontal sets 122. Each key structure 120 may extend a height h above the surface 108. In one embodiment, a key structure portion 141 extending from surface 108 is includes a rectangular base 143 and the exterior surface 144 having an outward curvature (e.g. convex), so as to form a cylindrical area over the surface 108. The curvature of key structures in FIG. 2A is about the vertical axis (Y). In another implementation, the portion 141 extending from surface 108 may omit the rectangular base and provide only the outward curvature. The user may make contact with a finger or stylus to the exterior surface 144 to direct the individual key structure inward into the housing 110, causing actuation of that key.

In one implementation, the exterior surface 144 has a peak 146 at a centerline of the key structure, with a symmetrical inward curvature 147 that extends from peak 146 towards the lateral edges 148, 148 of the individual key structure 120. A horizontal distance between lateral sides 148, 148 represents the width W of the key structure 120.

In an embodiment, a separation t between adjacent key structures 120 in the horizontal sets 122 may be reduced or minimized, so that the key structures are nearly abutting. In one embodiment, the separation represented by t is less than 0.1 mm, and preferably between 0.04 mm and 0.06 mm. In one implementation, this distance is about 0.05 mm. Other embodiments enable greater separation between key structures, while maintaining the nearly abutting relationship between adjacent horizontal key structures. For example, the key structures may be up to 0.7 mm spaced apart.

A bottom portion 149 of the key structure 120 may extend underneath the surface 108 of the housing. In an embodiment, the bottom portion 149 may be aligned with and/or connected to a corresponding actuation member 152 that move inward with insertion of the key structure 120. When the key structure 120 is struck and moved inward, the corresponding actuation member 152 makes contact with an aligned electrical contact, thereby actuating an electrical signal to processing resources of the computing device. The alignment of each key structure, its corresponding actuation member 152, and the aligned electrical element enable processing resources of the mobile computing device to correlate key strikes to a particular value, such as a particular letter of the alphabet. In one embodiment, the actuation members 152 are joined or integrated with the corresponding key structures 120. For example, each actuation member may be molded or otherwise formed into a bottom surface of the corresponding key structure. In another embodiment, the actuation members 152 may be separately formed from the key structures 120. With embodiments described with FIG. 11 and elsewhere in this application, the actuation members 152 may form part of a stack assembly that is inserted underneath the keyboard 100. Such a stack assembly may also include the aligned electrical contacts, as well as an illumination layer. In an embodiment, the distance t may be less than or equal to the tolerance level for assembling the stack for the keyboard 100.

The cross-section of FIG. 2B illustrates adjacent key structures 120 in different horizontal sets 122. From a perspective shown by FIG. 2B, each key structure 120 extends the height h from the surface 108 with no curvature. The length L of the key structure 120 may be defined as a distance between a top edge and a bottom edge 127, 129 of the key structure 120. The key structures 120 may extend from openings 154 formed in surface 108 of the housing 1110. In one implementation, each opening 154 is extends lengthwise in the horizontal direction (X) to accommodate an entire horizontal set 122. Alternatively, each opening 154 may accommodate only an individual key structure 120, or some other combination of key structures.

Below the housing 110, the key structure 120 may include extensions 155 that extend underneath an interior formation 156 of the housing 110. The interior formation 156 may provide additional space to accommodate lateral extensions 155 of the key structure 120. At the same time, the interior formation 156 overlays the lateral extensions 155 to prevent the key structure from falling out of the housing 110. In this way, an embodiment provides that individual key structures 120 have housing support on their respective vertical edges, but not their lateral edges 148, 148. In FIG. 2B, lateral extensions 155 of the key structures 120 extend underneath the housing 110 at edges 151, 153.

In an embodiment, a distance T separates proximate key structures 120 in the vertical direction (Y). According to an embodiment shown by FIG. 1, the distance T separates adjacent horizontal key sets 122. The housing strip 112, occupying an area extending the distance T, may be visible to the user. In one implementation, the distance T measures between 1.0 and 5.0 mm, and more preferably between 2.0 and 4.0 mm.

From the perspective shown in FIG. 2B, insertion of the key structure 120 causes actuation member 120 to move inward and trigger an electrical contact. Mechanisms such as described in FIG. 2A (e.g. integrated actuation member 152) or elsewhere in this application (e.g. modular mechanical stack) may be used to correlate insertion of the key structure 120 and actuation of a corresponding electrical signal.

With reference to FIGS. 2A and 2B, individual key structures 120 may be provided on one or more carriers or carrier strips. In one implementation, for example, the key structures 120 may be molded, joined or otherwise connected or integrated to a single carrier 159. The single carrier 159 may extend underneath the housing 110 in both the X and Y direction. Alternatively, the carrier for the key structures 120 may be in the form of a strip that extends to provide key structures for individual horizontal sets 122.

Figure 2C:
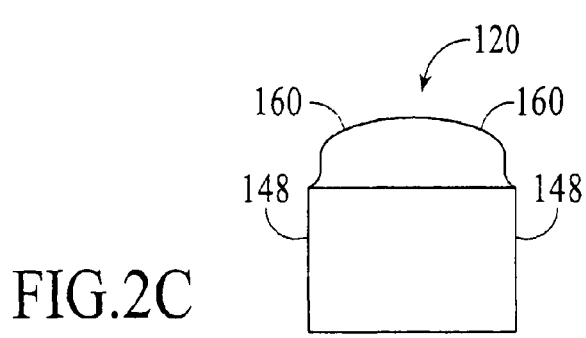
FIG. 2C illustrates an implementation of the groove (or scallop) at the juncture of the lateral edges and the exterior surface of a key.

In one embodiment, a spacing structure or formation may be provided at the juncture of the curved exterior surface 145 and the lateral edges 108. The spacing formation may be in the form of a groove or scallop. FIG. 2C illustrates an implementation of the groove 160 (or scallop) at the juncture of each of the lateral edges 148, 148 and the exterior surface 144. The formation enables the user to see and/or feel (through fingers) further separation between adjacent key structures 120 in the horizontal set 122.

Key Structure Design

Figure 3A:
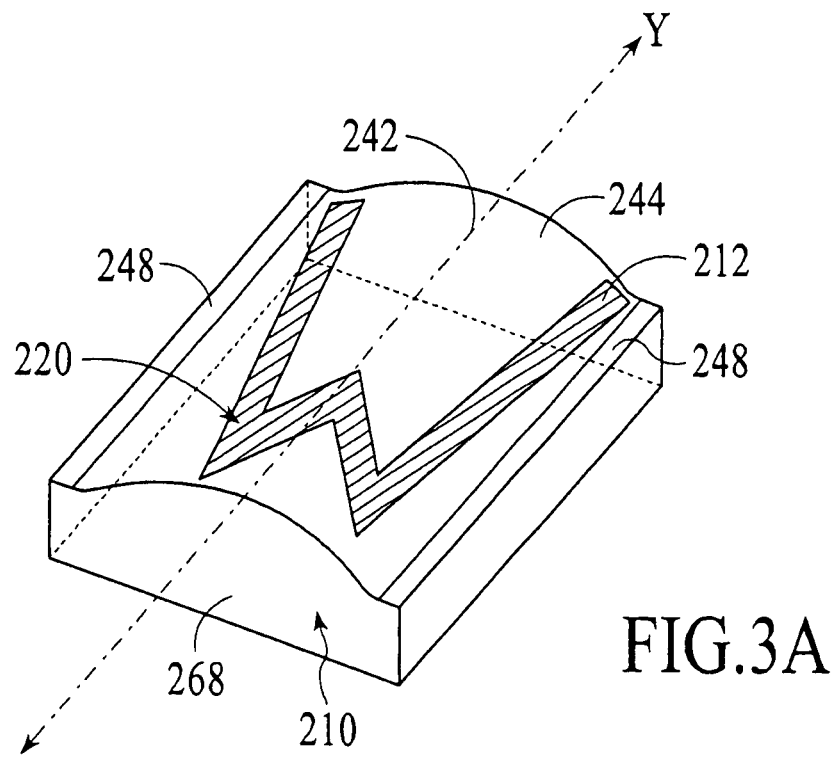
FIG. 3A is an illustrative isometric view of an isolated key structure with a sub-layer ornamentation, according to an embodiment of the invention.

FIG. 3A is an illustrative isometric view of an isolated key structure 220, according to an embodiment of the invention. The key structure 220 has a base 210 that extends at least partially into the housing 110 (see FIGS. 2A and 2B). An exterior surface 244 extends over the base 210, forming a cylindrical or barrel shaped surface to meet the user's finger tip or stylus. The key structure 210 is provided with an ornamentation 212 that is printed or otherwise formed on the exterior surface 245. In one embodiment, an up-down orientation of the ornamentation 212 coincides with the vertical direction (Y) (SEE FIG. 1). As a result of the key structure being elongated, ornamentation 212 may also be elongated, making the letter and/or characters assigned to the individual keys larger and more viewable to the user. The key structure's lengthwise direction 242 also coincides with the vertical direction (Y). A curvature of the exterior surface 244 is provided about the lengthwise direction 242, with the peak of the curvature appearing at the centerline of the exterior surface 244.

In one embodiment, lateral grooves 248, 248 may be provided to facilitate the user's ability to separate and select adjacent key structures in the horizontal direction (Y). The lateral grooves 248, 248 may extend the length of the key structure 120. The particular type of space formation may vary.

Figure 3B:
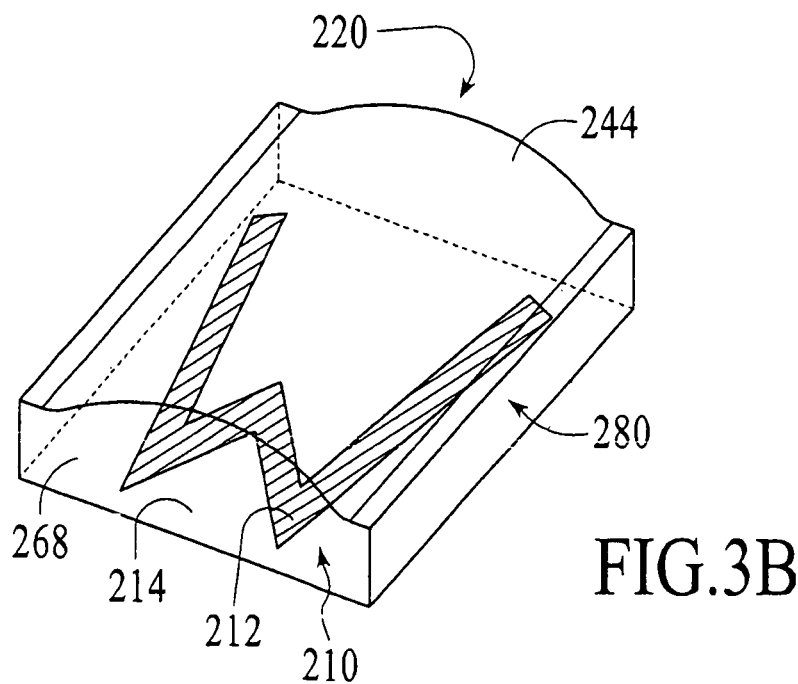
FIG. 3B is an illustrative isometric view of an isolated key structure with a sub-layer ornamentation, according to an embodiment of the invention.

FIG. 3B is an illustrative isometric view of a key structure 220, with an alternative outward appearance. In FIG. 3B, the ornamentation 212 is provided within or underneath a body 268 of the key structure 220. In an embodiment shown, the body 268 of the key structure 220 may be formed from a clear or translucent material, such as a clear plastic. The ornamentation 212 may be formed on a surface 214 or region underneath the body 268, such as on a film layer (see e.g. FIGS. 5A-5G).

Non-Abutting Keyboard Design

Figure 4A:
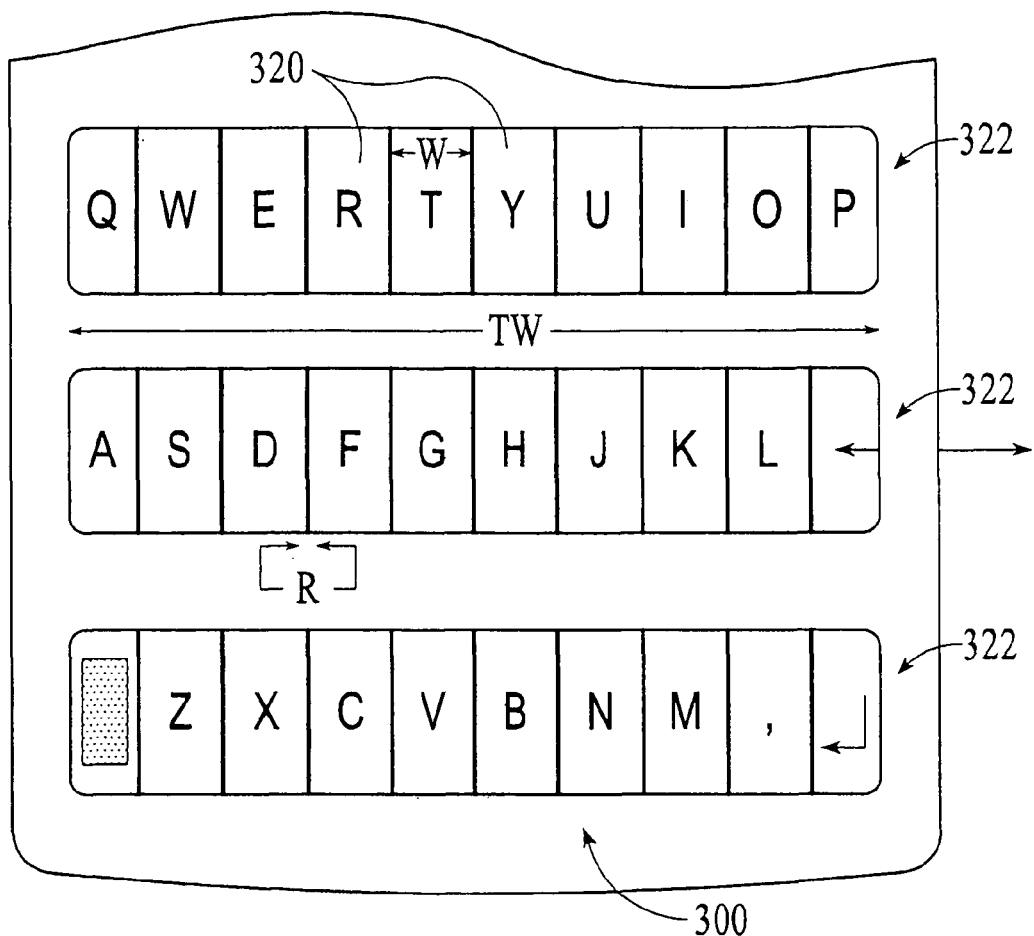
FIG. 4A illustrates an alternative keyboard layout with non-abutting key structures, according to an embodiment.

FIG. 4A illustrates an alternative keyboard layout that does not employ use of nearly abutting key structures, according to another embodiment of the invention. With reference to FIG. 4A, a keyboard 300 may incorporate horizontal key sets 322 similar to a configuration such as shown in FIG. 1, except that adjacent key structures 320 in the horizontal key sets 322 are not nearly abutting one another. Rather, a spacing R may exist between adjacent key structures 320 in the horizontal sets 322. The spacing may be sufficient in dimension to allow users to view into a gap formed by the adjacent key structures 320. A housing structure in the spacing R, or a space interior to the housing may be readily viewable to the user. For an implementation that employs a stack assembly, the adjacent key structures 320 in each horizontal key set 322 may be closely spaced, but still separated by a distance that is non-abutting. Even if the key structures 320 are considered non-abutting, a relationship where TW is substantially or approximately equal (within 80% or 90%) of the sum of the individual maximum widths W may still hold true.

According to an embodiment, the adjacent key structures 320 in each horizontal key set 322 are spaced by a distance that exceeds 0.75 mm. In one implementation, the range of separation between adjacent key structures 320 is between 0.75 and 1.5 mm, and more preferably of the range of 1.0 mm. The separated distance between the key structures 320 may refer to a minimum distance between the two structures as they extend above the surface of the housing.

Figure 4B:
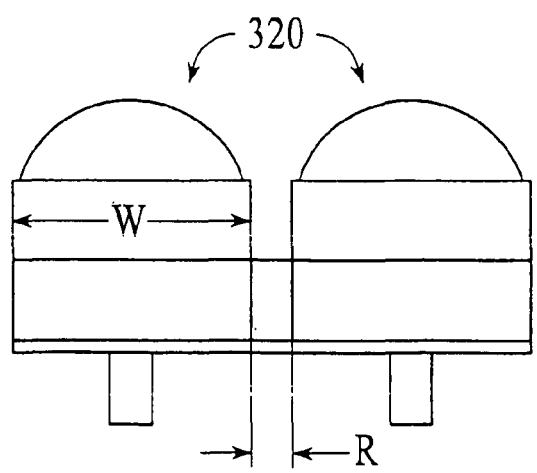
FIG. 4B illustrates adjacent key structures from a horizontal set of key structures in the keyboard shown with FIG. 4A.

FIG. 4B illustrates adjacent key structures 320 of one of the horizontal key sets 322 in the keyboard 300. In contrast to an embodiment such as shown by FIG. 2A, the adjacent key structures 320 are separated by the distance R, which is sufficient in dimension to not provide the appearance of being abutting. As such, this distance permits the user to view an underlying space or region between the key structures 320. In an embodiment, the distance R is still sufficiently small to avoid the need for providing the housing surface 108 in between the key structures in the horizontal sets 322. In another embodiment, the dimensions of the key structures 320 may be made more narrow in the horizontal direction to make extension of the housing surface 108 in between the key structures of the horizontal sets 122 practical.

Keypad Manufacturing Processes

FIG. 5A-5G illustrate a manufacturing process for producing a keyboard having nearly abutting key structures, as described with FIG. 1 and FIG. 2A-2B, under an embodiment of the invention. A process such as described in FIG. 5A-5G allows for individual key structures to be placed sufficiently close to one another so as to qualify as being "nearly abutting". As will be described, a process illustrated by FIG. 5A-5G creates separated sets of key structures that are interwoven together as part of the assembly process to form a keyboard 100 such as described in FIG. 1. Such a manufacturing technique provides an alternative to using standard molding techniques for forming the individual key structures of the keyboard 100, as standard molding techniques are difficult to implement in a manner that allows key structures to be spaced by a distance that is nearly abutting to another key structure. In contrast to the standard molding techniques, the use of interweaving patterns to assembly separate key structure groups into one keyboard enables adjacent key structures 120 in the horizontal sets 122 of keyboard 100 to be placed sufficiently close to one another to be nearly abutting. As such, any reference to a numeral of FIG. 1 is intended to illustrate a suitable or descriptive element for a particular step or process.

Figure 5A:
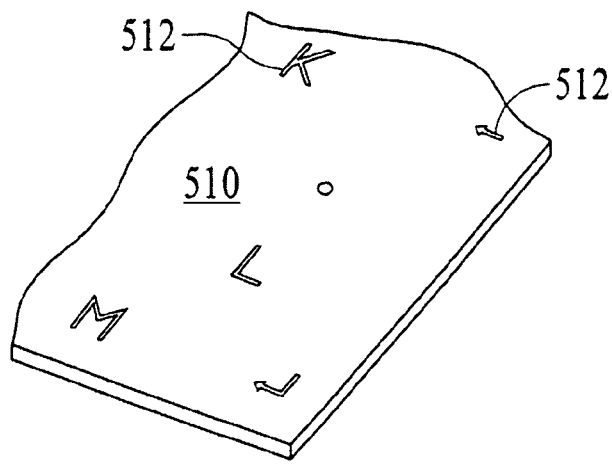
FIG. 5A-5G illustrate a manufacturing process for producing a keyboard having nearly abutting key structures, as described with FIG. 1 and FIG. 2A-2B, under an embodiment of the invention.

As shown in FIG. 5A, a thin film 510 formed from polycarbonate or other flexible material is used as a base for individual key structures. A print or silkscreen image is created on the film to provide the ornamentations 512 that are to be placed on the individual key structures. In an example provided by FIG. 5A, the ornamentations 512 are in the form of letters, although other ornamentations such as numbers and alternative characters may be printed on the film 510. The placement of the ornamentations 512 coincides with where individual key structures are to be formed that carry those ornamentations. As will be described, the individual key structures will be formed in separate groups or sets that are subsequently interwoven together. The location where each key structure is to be formed is dictated by an interwoven pattern used, and not necessarily by the relative position of that key structure relative to other key structures in the keyboard layout (e.g. QWERTY layout).

Figure 5B:
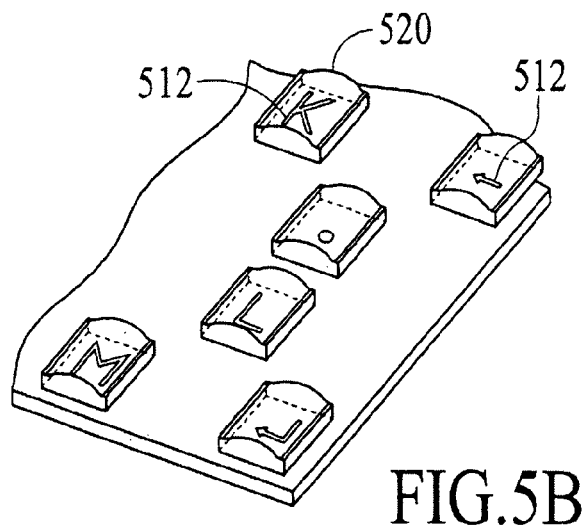

In FIG. 5B, a manufacturing step is shown where individual key structures 520 are formed on the film 510 at locations where corresponding ornamentations are provided. Each key structure 520 is formed over one of the ornamentations, so that is carries that particular ornamentation.

Figure 5C:
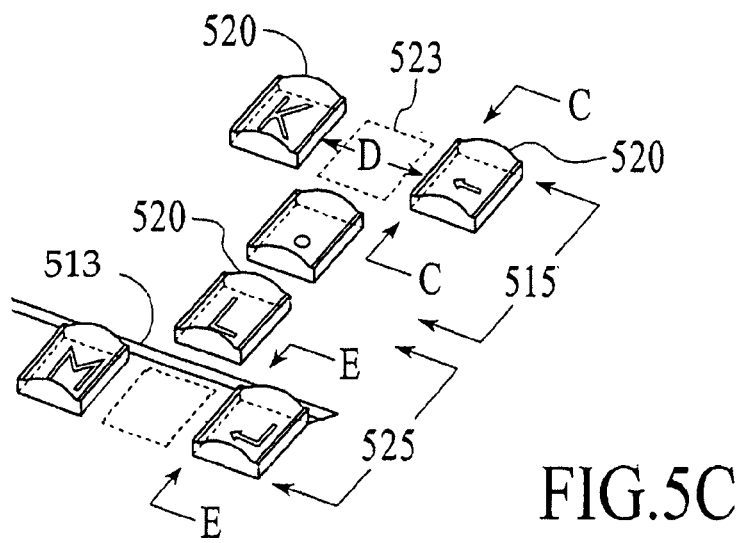

In FIG. 5C, film 510 is cut to form separate key structure groups 515, 525. In an example provided, each key structure group 515, 525 includes three key structures 520. The particular interweaving pattern used in the example provided is one where each key structure group 515, 525 includes at (i) at least two keys from a given horizontal set 122 in the keyboard 100; (ii) the two key structures are in the given horizontal set are not adjacent to one another in the keyboard layout, but rather separated by at least one other key; and (iii) at least one key structure from another one of the horizontal sets 122. As such, a void 523 exists between two key structures 520 of the same horizontal set 122. A dimension D of void 523 may be equal to a sum of the width of an individual key structure and the separation distances between that key structure and each adjacent key structure in its particular horizontal set (with reference to FIG. 2A, D=W+2t). A cut-out strip 513 of film 510 is used to join the key structures 520 of each group 515, 525. In each group 515, 525, the strip 513 extends a length to join the key structures 520 from the different horizontal sets. This length is about equal to the vertical separation between the horizontal sets 122 when the keyboard is formed. It should also be noted that the particular interweaving pattern used to form each key structure group is one of design choice. For example, other patterns may provide for key structure groups to include only key sets from a single row or horizontal set of keyboard 100.

Figure 5D:
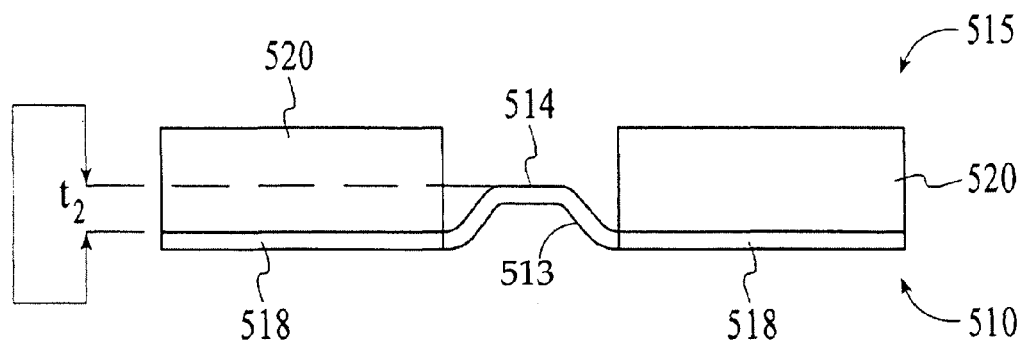

FIG. 5D is a side cross-sectional views cut along lines C-C of FIG. 5C, showing a cross-section of key structure group 515. The strip 513 extends between and join key structures 520 from different horizontal sets 122. The strip 513 is formed to include an upward bend 514 and plateaus 518 on opposite sides of the upward bend 514. A differential $t_2$ represents the differential between the upward bend 514 and the plateaus 518. The upward bend 514 separates the key structures 520, with individual key structures 520 provided on each plateau 518.

Figure 5E:
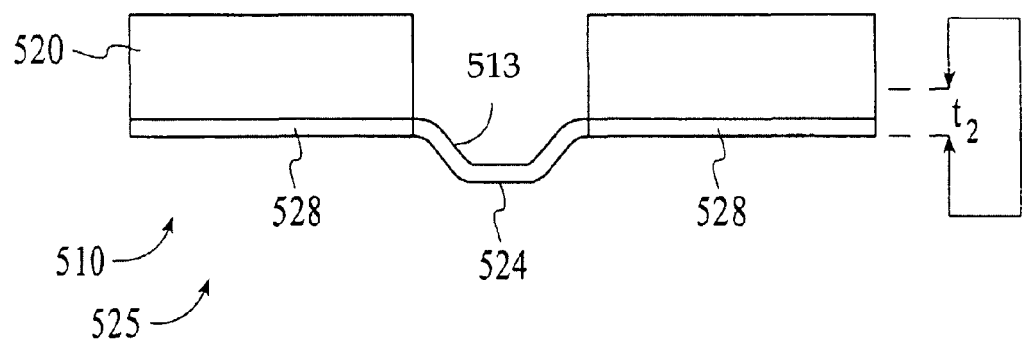

FIG. 5E illustrates another one of the key structure groups 525 with strip 513 joining key structures 520. This key structure group 525 is to be interlaced or weaved with the key structure group 515 of FIG. 5D. In order to provide an accommodating interwoven structure, key structure group 525 is provided with a downward bend 524 to adjoin key structures 520 on different horizontal sets 122. Each key structure 520 is provided on a corresponding plateau 518 that is raised with respect to the downward bend 524 by the differential t2.

Figure 5F:
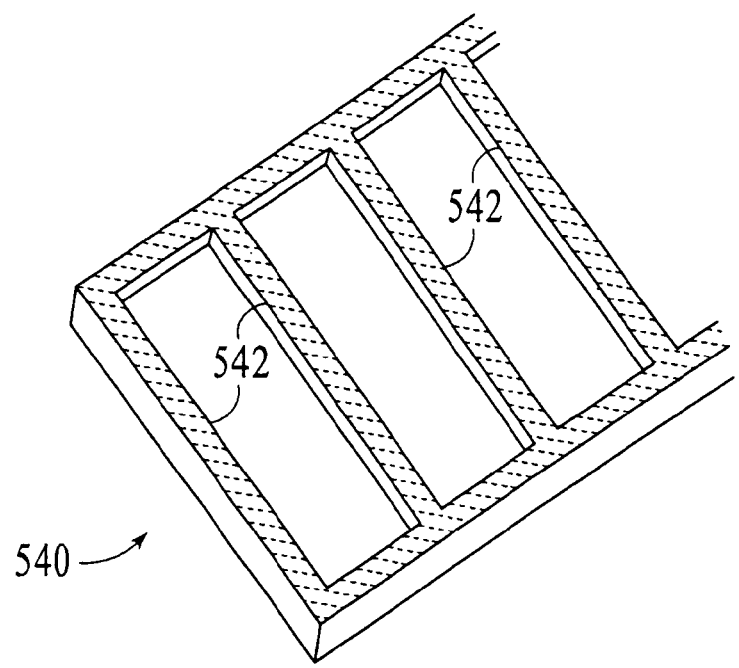

FIG. 5F illustrates a midframe 540 to hold two or more key structure groups 515. The midframe 540 includes openings 542 to hold key structures that eventually hold key structures of a common horizontal set 122.

Figure 5G:
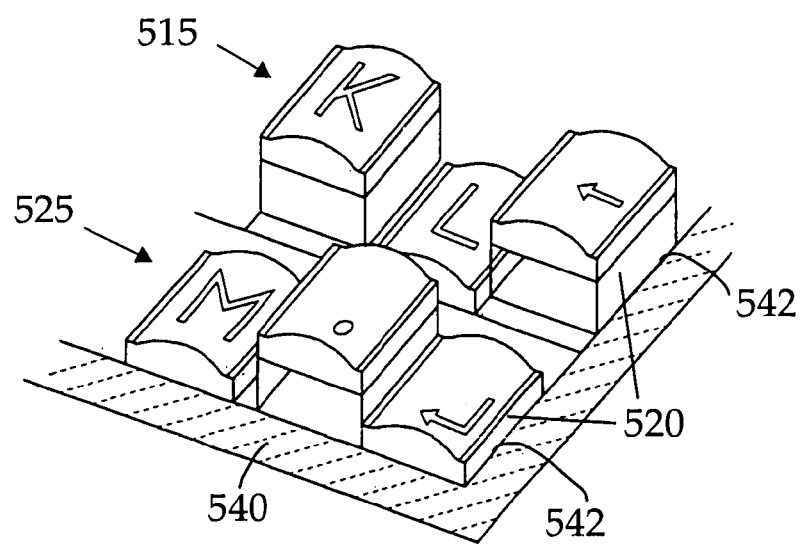

FIG. 5G illustrates that key structure groups 515, 525 are assembled in an interwoven fashion about the midframe 540. In one implementation, the strip 513 of one of the key structure groups 515 may be attached to a topside 544 of the midframe 540, with the key structures 520 of the group hovering in the openings 542 of the midframe. At the same time, the strip 513 of the key structure group 525 may be attached to an underside (not shown) of the midframe 540, with its key structures 520 extending out of the respective openings 542. The upward bend 514 and downward bend 524 enable the key structures 520 of the respective groups 515, 525 to be assembled in the interwoven manner about the midframe 540, without the strip 513 of one key structure group being in conflict with the strip of another key structure group. Rather, in the example provided, the strip 513 of the key structure group 515 is provided above the midframe 540, while the strip of the key structure group 525 is provided below the midframe 540. Once the strips 513 of each respective key structure group 515, 525 are connected to the midframe 540, the key structures 520 of the respective key structure groups float in the space provided by the openings 542, enabling each of those structures to move inward.

A manufacturing process for forming a keyboard such as described in FIG. 5A-5G enables a separation distance between adjacent key structures to be tighter than what would normally be allowed should key structures be formed through standard molding techniques. Thus, for example, a process such as described in FIG. 5A-5G may be used to place key structures 520 within 0.05 mm of one another, while a traditional molding technique would require the key structures to be separated by a distance no less than 0.5 mm.

FIGS. 6A-6D illustrate a different manufacturing process for forming a keyboard comprised of key structures, according to an embodiment of the invention.

Figure 6A:
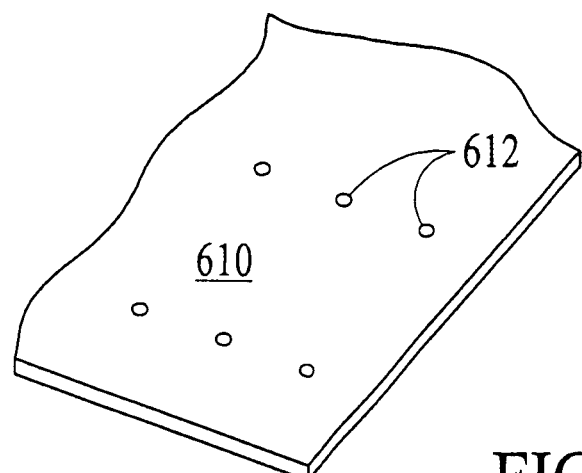
FIGS. 6A-6D illustrate a different manufacturing process for forming a keyboard comprised of key structures, according to an embodiment of the invention.
Figure 6B:
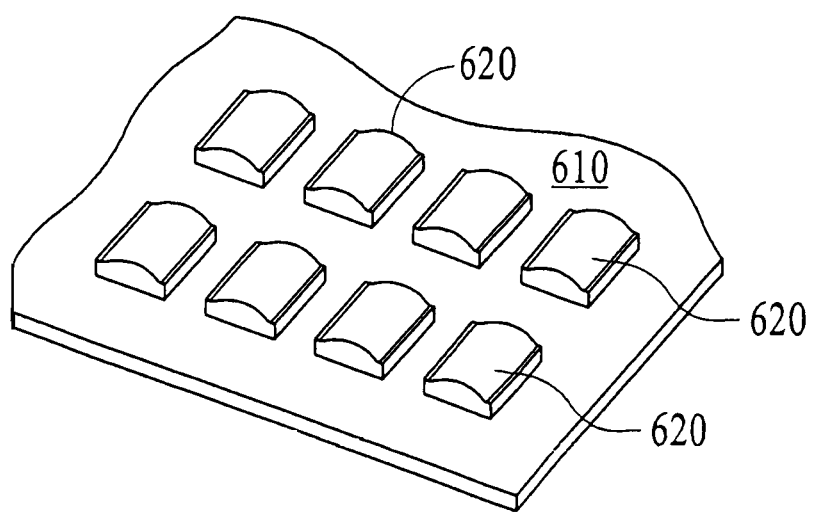

In FIG. 6A, a film of polycarbonate or similar material 610 is provided holes 612 where corresponding key structures 620 are to be formed. The holes 612 are used to provide material for molding the individual key structures 620. FIG. 6B illustrates the formation of the key structures 620 over the corresponding holes 612.

Figure 6C:
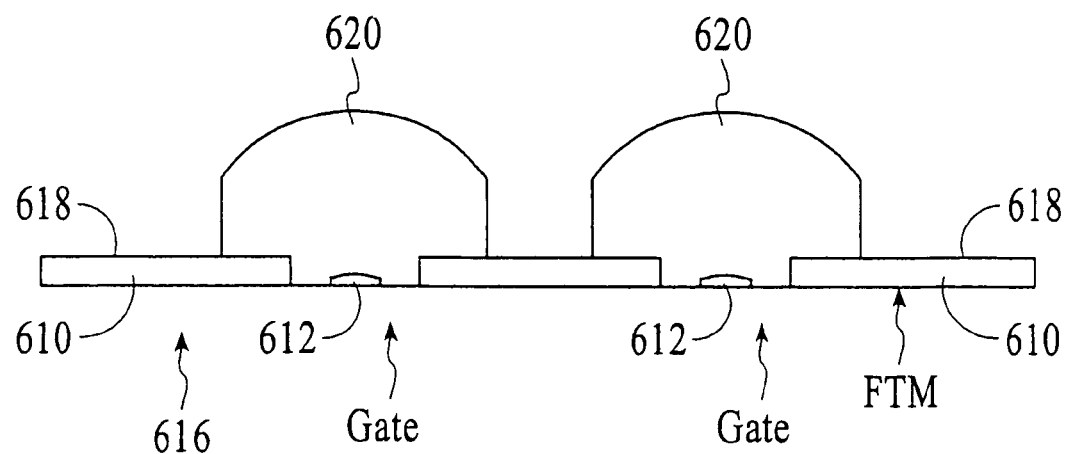
Figure 6D:
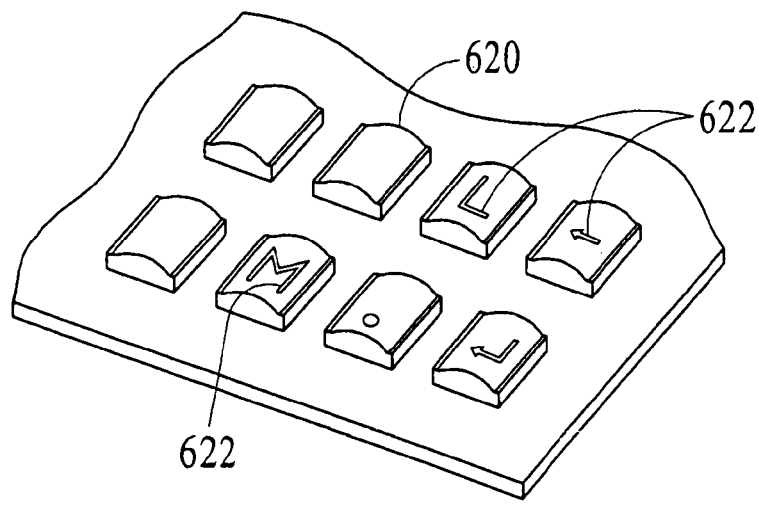

FIG. 6C illustrates how individual key structures 620 are formed over the film 610 using a molding process. A material for forming the key structures 620 is passed from the underside 616 of the film 610 through each of the respective holes 612. This may be accomplished by positioning gates for shooting the material against each hole 612 on the underside 616. The material is then passed through the individual hole 612 and used to form the key structure 620 on a topside 618 of the film 610. In one embodiment, the material pushed through the film 610 to form the individual key structures 620 is a resin material. The material may be made translucent or milky in order to make the ornamentations provided by the key structure 620 more noticeable, as well as to enable illumination from under the film 610 to illuminate the key structure 620. An ornamentation 622 on each key structure may be made through a surface printing of the corresponding key structure after that structure is formed. Alternatively, the ornamentation may be formed on the film 610 before the formation of the key structure 620. For example, the ornamentation 622 for each key structure 620 may be formed on the film at the region where each hole 612 is provided. The material used to form the key structure 620 may be translucent (e.g. clear resin), so that the ornamentation 622 underneath the key structure is visible, particularly with illumination from underneath the key structure 620.

A manufacturing process such as shown by FIG. 6A-6D enables more precise formation of key structures 620 than would otherwise be possible using more traditional or common molding techniques. A process such as shown by FIGS. 6A-6D may yield spacing between key structures as described with, for example, embodiments of FIG. 1 and FIG. 4A.

Various other manufacturing processes and techniques exist for forming a keyboard or keypad, such as described with embodiments of the invention. FIG. 7A-7E illustrate another technique, in which a molding process can be used to form the individual key structures 720, with ornamentation provided through an underlying film 710.

Figure 7A:
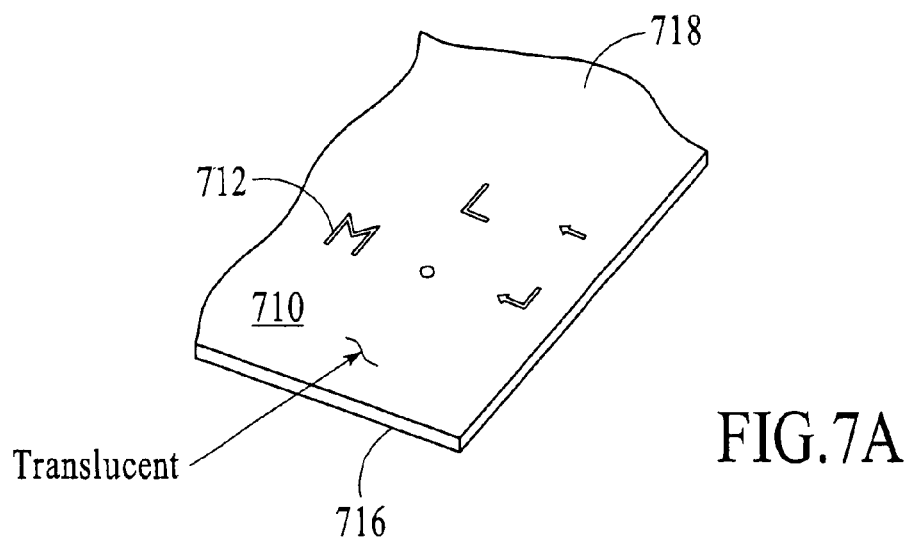
FIGS. 7A-7E illustrate another technique for forming a keypad or keyboard, under an embodiment of the invention.

In FIG. 7A, a film 710 (e.g. polycarbonate material) is formed to include ornamentations 712. The ornamentations 712 are printed on an underside 716 (or backside) of the film 710. The film 710 may be formed from translucent material to enable the ornamentations to be visible from the topside 718 of the film 710.

Figure 7B:
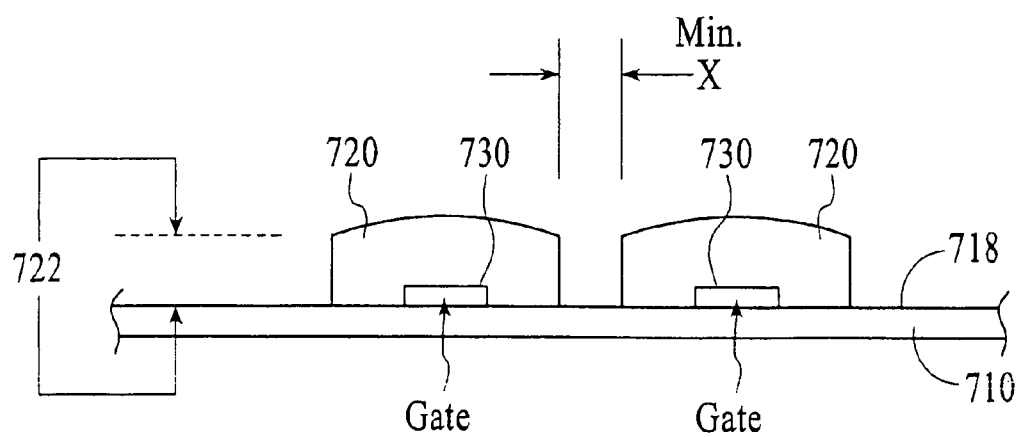
Figure 7C:
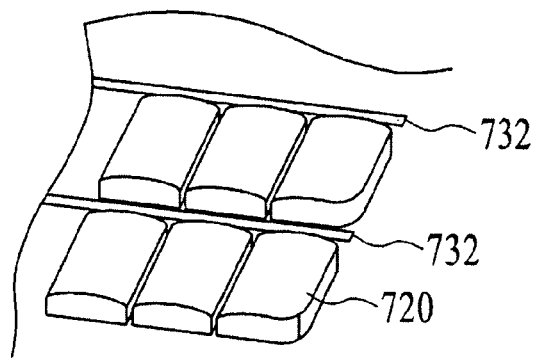

FIGS. 7B and 7C illustrate that key structures 720 are formed using gates 730 on the topside 718 of the film 710. The resulting key structures 720 may be formed through the gates to include a key structure shape. Thus, in contrast to an embodiment such as described with FIG. 5, the gates may be provided on the same side of the film 710 as the key structures that result from the molding process. Each key structure 720 may include a base region 722 over film 710 to stabilize the key structure on the film.

Figure 7D:
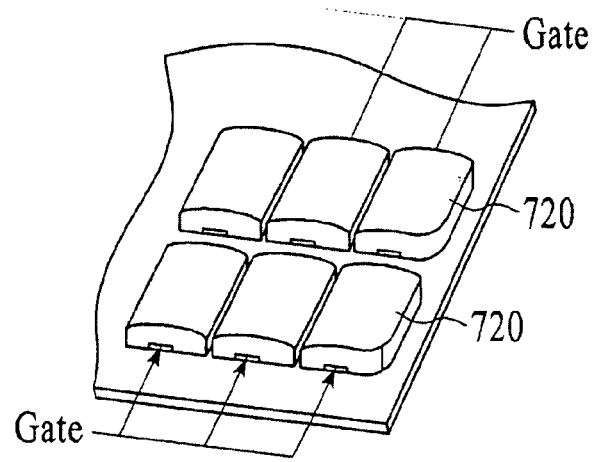

FIG. 7D shows an optional step where film 710 is cut or slit. A resulting slit patter 732 is provided. In an embodiment shown, the slit patter 732 consists of slits that extend in the horizontal direction, so as to separate horizontal sets 122. The slit pattern 732 may improve the clickability of the individual key structures 720.

Figure 7E:
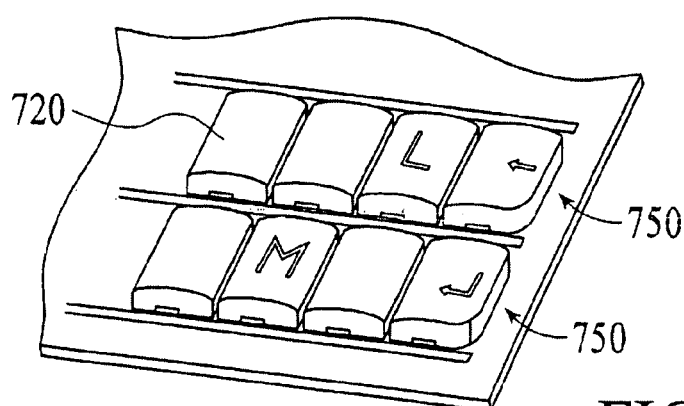

FIG. 7E shows the completed keyboard, with key structures 720 molded on the topside 718 of the film 710, and ornamentation 712 provided on the underside 716 of the film 710. Separate rows 750 (or horizontal sets) of key structures 720 are provided. The spacing between adjacent key structures in a given row 750 may vary. In one embodiment, the spacing is of the range of 0.3-1.0 mm, so that the individual key structures are close, albeit not nearly abutting.

Keyboard Implementation on Mobile Computing Devices

Figure 8A:
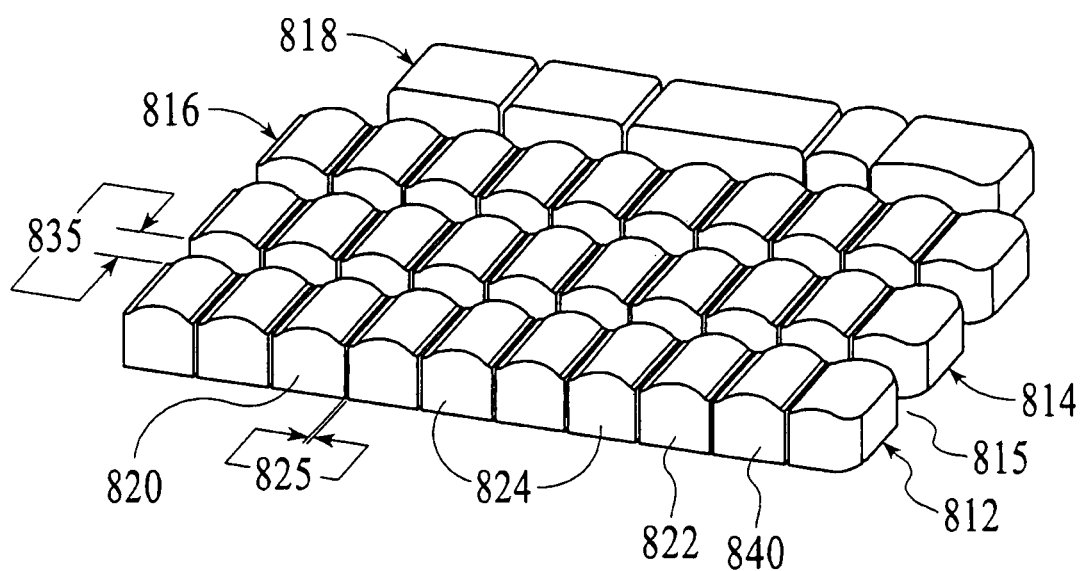
FIG. 8A is an isometric view of a keyboard separated from a mobile computing housing, according to an embodiment of the invention.

FIG. 8A is an isometric view of a keyboard separated from a mobile computing housing, according to an embodiment of the invention. The keyboard 800 includes key structure rows 812, 814, 816 and 818, where key structures 820 that comprise the rows are arranged in a QWERTY layout. The perspective shown in FIG. 8A provides the first row 812 containing the "QWERTY" keys as being the most proximate.

Each key structure 820 includes a base 822 and an exterior surface 824. The base 822 may at least partially reside within a housing of the mobile computing device. In one embodiment, the key structures 820 may be provided on a carrier 815, or a combination of carrier strips that interconnect two or more of the key structures. The exterior surface 824 may include an outward contour along the vertical axis Y. As a result, each key structure 820 is provided a barrel or cylindrical shape on its exterior. A minimum horizontal distance 825 between the base 822 of adjacent key structures 820 of each row 812-818 is sufficiently small (e.g. 0.05 mm) to give each key structure 820 the appearance that adjacent key structures are abutting. As such dimension of horizontal distance 825 may be sufficiently small to preclude users from seeing between the bases 822 of the adjacent key structures 820. In contrast, a minimum vertical distance 835 between key structures 820 adjacent rows does not give the appearance that the key structures are abutting. For example, a housing section, or an underlying surface of the keyboard extending the vertical distance 835 of proximate key structures, may be plainly visible to sight.

To distinguish adjacent key structures 820, an embodiment such as shown by FIG. 8A provides for formation of a groove 840 or scallop on lateral edges of each key structure. Each groove 840 may separate the key structure 820 from an adjacent key structure in the row-wise direction.

Figure 8B:
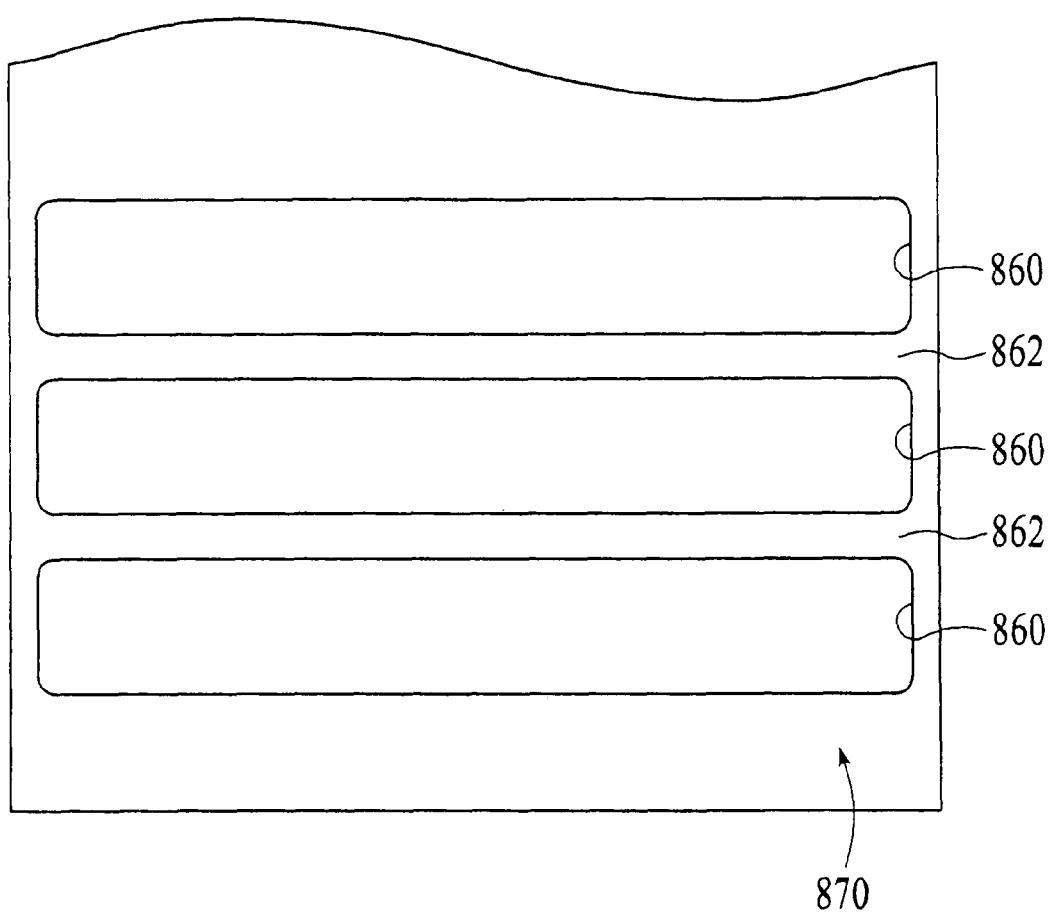
FIG. 8B is an isometric view of a mobile device housing for a keyboard, under an embodiment of the invention.

FIG. 8B illustrates a mobile computing device housing 870, for use with an embodiment of the invention. The housing 870 may include a plurality of openings 860 to accommodate horizontal sets of key structures (e.g. horizontal sets 122 in FIG. 1). As shown by FIG. 8B, the openings 860 may extend in the X direction to accommodate the entire width (TW in FIG. 1) of the horizontal set. As such, the openings 860 contain no intersecting housing structure to separate or laterally support adjacent key structures. The keyboard 800, for example, may be coupled with the housing 870 so that the individual key structures 820 extend from a surface 862 of the housing. No horizontal support is provided between key structures 820 (other than the carrier 815). The absence of horizontal support and intersecting housing structures within openings 860 provide one mechanism by which key structures can be made nearly abutting. In contrast, the openings are spaced by the housing surface 162, which provides a clearly visible separation between key structures in the vertical direction.

Figure 9:
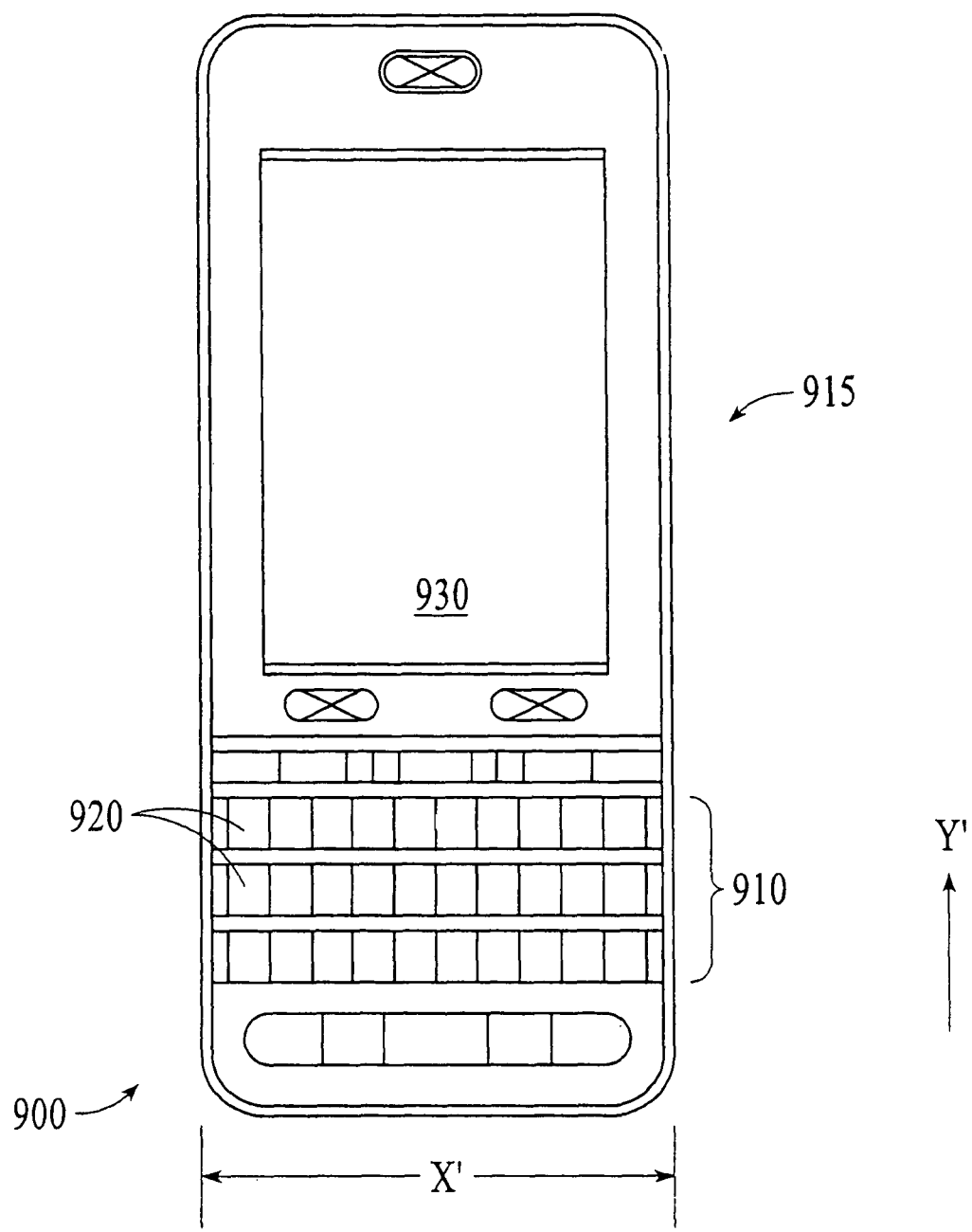
FIG. 9 is a frontal view of a mobile computing device, configured according to an embodiment of the invention.

FIG. 9 is a frontal view of a mobile computing device, configured according to an embodiment of the invention. A device 900 such as shown in FIG. 9 may have both text-messaging capabilities (e.g. email, instant message, etc.) and cellular-voice capabilities. As such, the device 900 requires both keyboard 910 and cellular phone functionality. Despite the dual functionality of the device 900, the device is provided dimensions that are more in accordance with traditional cellular phones. A width (along axis X') of the computing device 900 is the limiting dimension. As such, features of the mobile computing device that require the most area are elongated. In embodiment shown, the display 930 and individual key structures 920 of keyboard 910 are elongated in alignment with a length of the device 900 (along axis Y'). The keyboard 910 may be configured similar to embodiments such as described with FIG. 1 and FIG. 4A.

In addition to having elongated key structures, a dimension of the keyboard 910 may extend almost all of the width of a front panel 915 of the device 900. As such, the width of the keyboard 910 is substantially equal to the width of the mobile device 900. Furthermore, individual key structures 920 may be tightly spaced (either to be abutting or non-abutting), so that each key structure can have a maximum individual width. The result is a combination of relatively large key structures 920 on mobile computing device, having dimensions (specifically width) that is substantially that of a traditional cell phone. In one embodiment, the size of the computing device, in combination with the dimensions of the keyboard 910 and individual key structures 920, allows for the user to hold the mobile computing device in one hand while readily operating the keyboard with that same hand.

Figure 10:
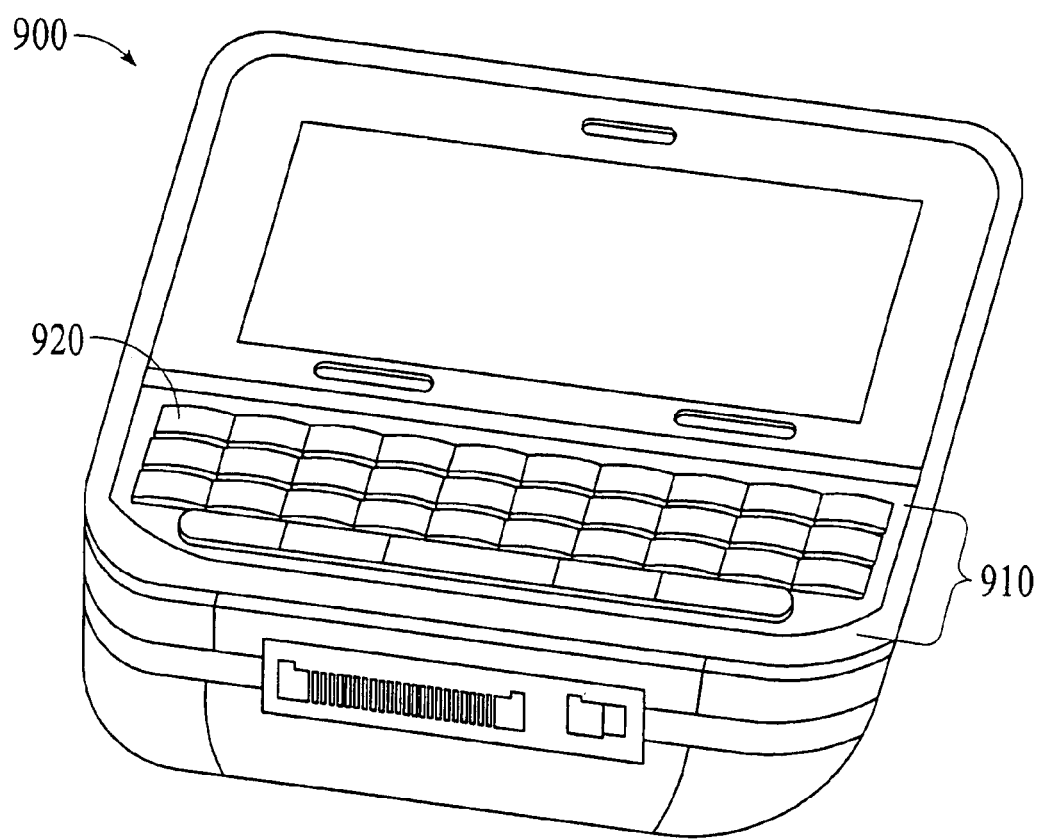
FIG. 10 illustrates a frontal and bottom isometric view of the mobile computing device 900, according to an embodiment of the invention.

FIG. 10 illustrates a frontal and bottom isometric view of the mobile computing device 900, according to an embodiment of the invention. As shown, the individual key structures are tightly spaced together in the row-wise direction, either in abutting or non-abutting fashion. Each key structure 920 is provided a barrel shaped exterior, having an outward curve. This facilitates the user's selection of keys when operating the keyboard 910.

Stack Assembly Overview

Embodiments described herein provide for a modular or integrally assembled stack that can be used to make keypads of mobile computing devices operable. Embodiments such as described with FIG. 11 may be implemented in conjunction with a keyboard layout embodiment such as described with FIG. 1 and FIG. 4A. However, a stack such as described by embodiments of the invention may also be used with numerous other types of keypads or keyboards, including keyboards or keypads that are not included with embodiments of the invention.

According to one embodiment, a stack assembly is provided for use with a keyboard or keypad of a mobile computing device. In one embodiment, the stack assembly includes an electrical contact layer, and actuation member layer, and an illumination layer. The electrical contact layer includes a plurality of contact elements. The actuation member layer includes a plurality of actuation members are, wherein each actuation member is aligned so that an axial movement of that member causes a corresponding one of the plurality of contact elements to actuate. The illumination layer is configured to emit light to the keypad.

As used herein, the term "axial" movement also means vertical movement, or movement in a direction that is inward with respect to a housing of the mobile computing device.

The term "layer" refers to an occupied thickness. A layer may include more than one type of material, including sub-layers (e.g. underlying film).

In another embodiment, a mobile computing device is provided having a housing, one or more processors contained within the housing, and a keyboard comprising a plurality of key structures provided on a surface of the housing. Additionally, a modular stack assembly may be contained within the housing and operatively engaged with the keyboard to enable each of the plurality of key structures to be operated to register input with the one or more processors.

The terms "integral" or "integrally combined" mean that elements or components are combined to form a single or modular unit. For example, different materials and fabrication processes may be used to integrally form a stack, but after its formation, the stack may be treated as a single or modular unit.

The term "operatively engaged" means that two elements are coupled in a manner that is operative, assuming electrical power is provided if needed for operation of the coupled elements.

Throughout this application, numerous references are made to measurements, such as distances and positions. The use of language, such as "about" or "approximately", is used to define or quantify such measurements should be assumed to have some margin of variation (e.g. plus/minus 5%) as deemed practical given the context of the usage.

Components of Modular Stack Assembly

Figure 11:
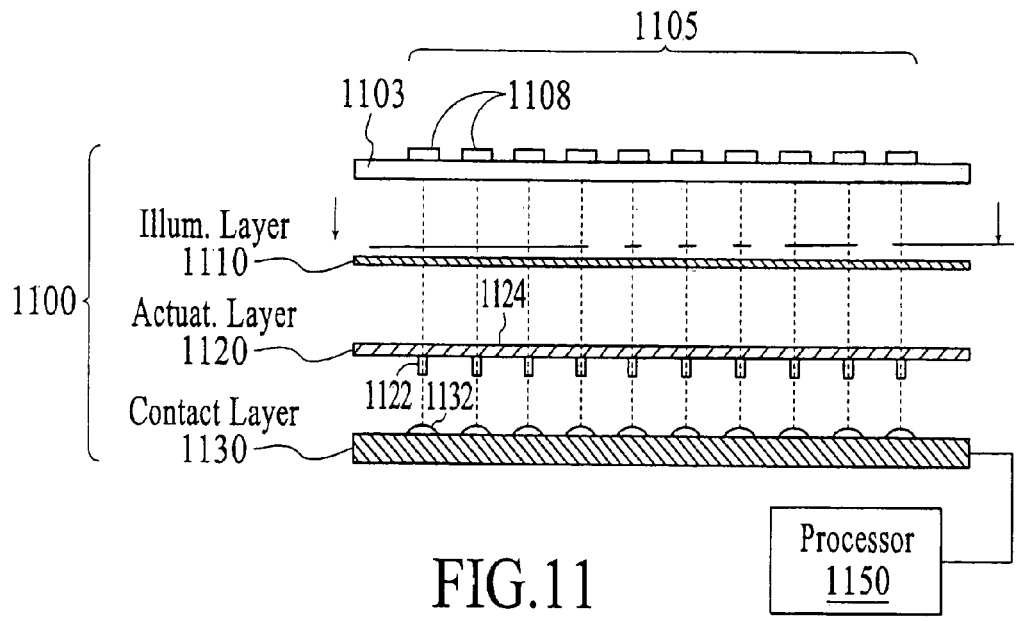
FIG. 11 illustrates basic components of a stack assembly for use with a keypad or keyboard of a mobile computing device.

FIG. 11 illustrates basic components of a stack assembly for use with a keypad or keyboard of a mobile computing device. A stack 100 includes an illumination layer 1110, an actuation member 1120, and an electrical contact layer 1130. FIG. 11 illustrates one simplified arrangement for the layers, with illumination layer 1110 provided most proximate a surface of a housing 1103 on which key structures 1108 of a keyboard 1105 (or other type of keypad set) are provided. The key structures 1108 may be extended from the housing 1103 through corresponding openings or apertures formed in the housing. The stack 1100 electronically interconnects or interfaces the keypad 1105 with a processor 1150 or processing resources of the mobile computing device.

The illumination layer 110 includes lighting resources that illuminate the keyboard 1105, or at least individual key structures 1108 in the keyboard 105. The electrical contact layer 1130 provides individual contact elements 1132 that are electrically interconnected via a printed circuit board, flex circuit, or other mechanism, to processing resources of the mobile computing device. Each contact element 1132 may be assigned to one of the key structures 1108. The actuation member layer 1120 includes individual actuation members 1122 that are aligned with a corresponding contact element 1132 and key structure 1105. Each individual actuation member 1122 travels with insertion of the corresponding key structure 1105 into the corresponding contact element 1132, causing that contact element to be switched or otherwise actuated. The result is that the processing resources of the mobile computing device are provided a signal corresponding to insertion of the particular key structure 1108.

While FIG. 11 illustrates a particular order of placement of the layers in the stack 100, other arrangements and ordering of the different layers of the stack are possible. In addition, other components may comprise the stack 100. Some of these arrangements are described below.

In an embodiment shown by FIG. 11, each layer may be fixed, joined or statically placed to an adjacent layer, so that the layers that form the stack assembly or integrally combined. The integral formation of the stack 1100 means that the stack assembly can be treated as single unit, or as a module. As such, it is possible for the stack 1100 to be assembled separately from other components of a mobile computing device. For example, stack 1100 may be assembled as part of an original equipment manufacture (OEM) process. Subsequently, stack 1100 may be inserted as a modular component into the housing of the mobile computing device during a separate manufacturing or assembly process.

Numerous mechanisms and means may be employed in order to affix or statically interconnect the different layers of the stack 1100. For example, embodiments described below employ adhesives to affix one layer of the stack 1100 to another layer. Other mechanisms, such as mechanical fasteners (e.g. screws, clips, snap-on couplings) may also be employed to secure one layer with another.

The placement of each layer that forms the stack 1100 may align to enable each key structure 1108 to be insertable and cause the corresponding element 1132 on the electrical contact layer 1130 to actuate. The actuation members 1122 enable key structure insertion and/or travel to translate into actuation of the corresponding electrical element 1132. The electrical contact layer 1130 and the actuation member layer 1120 may be aligned so that each key structure 1108 of the mobile computing device is insertable to effectuate an input with processor 1150. The processor 1150 may correlate the electrical contact element 1132 switched with the corresponding input. The illumination layer 1110 may also be aligned with the key structure 1108 so that light-emitting sources align with corresponding key structures 1108. According to an embodiment, alignment structures and mechanisms may be used to align the layers of the stack 100 during its formation. For example, alignment pins and pin holes, ridges, and/or optical markers may be used to align one of the layers in the stack assembly 1150 with an adjoining layer.

Illumination Layer

The illumination layer 1110 illuminates the keyboard 1105 from within the housing 1103 of the mobile computing device. The illumination layer 1110 provides a medium on which light-emitting material or elements are provided. In one implementation, at least some of the key structures 1108 forming the keyboard 1105 may be made of translucent materials so that illumination from within the housing 1103 results in the key structures being illuminated to the user. In another implementation, regions in the keyboard 1105, such as around perimeters of individual key structures, may be illuminated.

According to one embodiment, the illumination layer 1110 is formed from electroluminescent (EL) material. The EL material illuminates may uniformly (or substantially thereof) illuminate across at least one or more regions of the illumination layer 1110. One result that can be achieved is that the keyboard 1105 may be sufficiently uniformly lit to avoid dark spots or darkened key structures 1105.

In another embodiment, the illumination layer 1110 may be formed from another type of lighting source. In one embodiment, the illumination layer 1110 may comprise a carrier that is provided discrete light sources, such as light-emitting diodes (LEDs). The carrier of the illumination layer 1110 may be formed from any material capable of carrying the light sources and the electrical conductivity to those sources. The LEDs may be patterned on the surface of the illumination layer 1105 to illuminate the individual key structures 1105 from underneath. Various patterns may be used to distribute the LEDs on the illumination layer 1110. Furthermore, other types of illumination sources may be used, such as incandescent light sources.

Actuation Member Layer

Figure 12A:
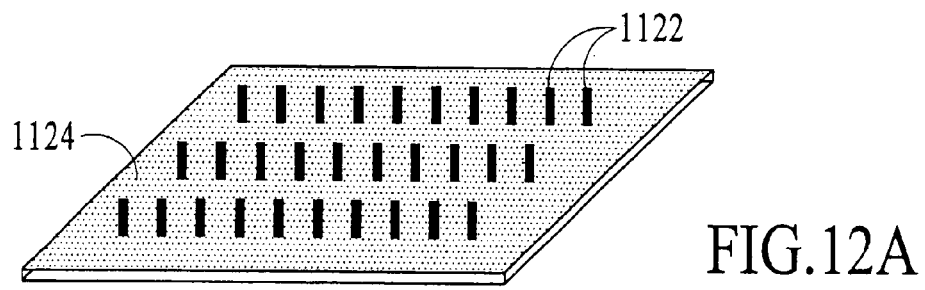
FIG. 12A illustrates an actuation member for use with a stack, under an embodiment of the invention.

FIG. 12A illustrates a general design for the actuation member layer 1120, according to an embodiment of the invention. Reference is made to elements of FIG. 11 for context. The actuation member layer 1120 includes a carrier 1124 from which the plurality of actuation members 1122 are provided. As illustrated by FIG. 11, each actuation member 1122 is aligned with a corresponding key structure 1108 and a corresponding contact element 1132 of the electrical contact layer 1130. When a given key structure 1108 travels inward, that key structure 1108 may direct the corresponding actuation member 1122 into the contact element. In one implementation, the actuation members 122 extend inward from the carrier 1124 towards corresponding contact elements 1132 of the electrical contact layer 1130. However, it is also possible for a portion of the overall length of each member 1122 to extend upward towards the key structure 1108.

In an embodiment such as shown by FIG. 12, the carrier 1124 may extend under the keypad 1105 to provide individual actuation members for each key structure 1108. The carrier 1124 enables the actuation members 1122 to be separately formed from the key structures 1108 and the electrical contact layer 1130. This is in contrast to some past approaches, where actuation members are formed as part of the key structure 1108, such as through extensions formed off of the bottom surfaces of the key structures. The carrier 1124 may be aligned and affixed to the electrical contact layer 1130 as part of an assembly process for the overall stack 1100. Subsequently, the carrier 1124 may be aligned with the keyboard 1105 of the mobile computing device in a separate assembly process.

According to an embodiment, the individual actuation members 1122 may be formed to be substantially more rigid than the carrier 1124. In one embodiment, the carrier 1124 is made from an elastomer or other flexible or compliant membrane to reduce resistance to inward travel by the actuation members 1122, and the actuation members 1122 are made rigid to be responsive to a user inserting the corresponding key structure. An example of a construction for the carrier 1124 is a thin sheet of silicon-rubber.

Figure 16:
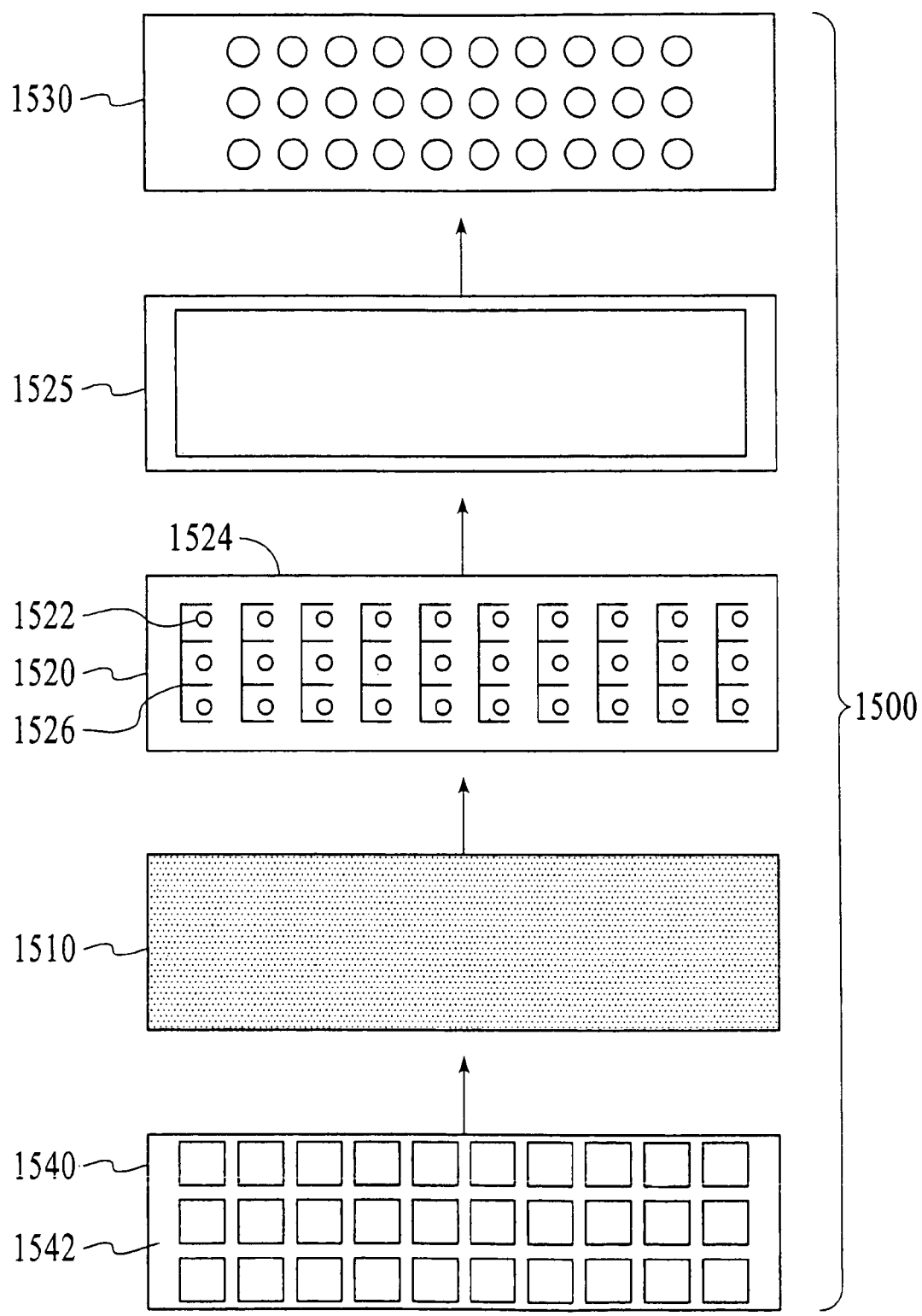
FIG. 16 is a frontal view of the different layers and elements that can be used to integrally form a modular stack, under an embodiment.

As described in FIG. 16, slits or cuts may be formed onto the carrier 1124 in order to enhance the flexibility of the carrier 1124. For example, three cuts may partially surround each member 1122. The cuts lessen the overall resistance provided by the carrier 1124 when the key structure 1108 directs the member 1122 inward.

As will be described in greater detail with FIGS. 17A-17E, different techniques for forming the actuation member layer 1120 may be employed. In one embodiment, the actuation member 1122 and the carrier 1124 are formed from an elastomer such as silicon-rubber or polycarbonate materials. In another embodiment, the carrier 1124 and the individual actuation members 1122 are formed from different materials that may be combined or otherwise joined, such as the silicon-rubber and hard plastic respectively. As further described by FIGS. 17A-17E, various techniques may be used to form the actuation member layer 1120 independent of the other layers in the stack 1100. For example, a co-molding process may be used to mold the hard or rigid material of the actuation member 1122 with the flexible material of the carrier. As another example, the actuation members 1122 may be separately joined to the carrier 1124 using adhesives or other forms of chemical bonds.

In one embodiment, an overall area of the actuation members 1122 is smaller than a footprint of the corresponding contact element 1132. In one implementation, the ratio of a diameter of the actuation member 1122 to a diameter of the corresponding contact element 1132 is less than 1:2, and preferably of the range of 1:4. An overall length of the actuation member 1122 is sufficient to actuate the corresponding contact element 1132. In one implementation, this length is about 0.5 mm. In an implementation such as described with FIG. 12B, where contact elements 1132 are snap-domes, the overall height needed is about 0.3 mm, corresponding to the separation of the outer contact surface 1135 (FIG. 12B) from the inner surface 1136 (FIG. 12B).

Electrical Contact Layer

In an embodiment, the electrical contact layer 1130 includes a substrate 1134, such as a printed circuit board or a flex circuit, on which the electrical contact elements 1132 are provided. Circuitry provided by the substrate 1134 may interconnect the electrical contact elements 1132 with the processor of the mobile computing device.

Figure 12B:
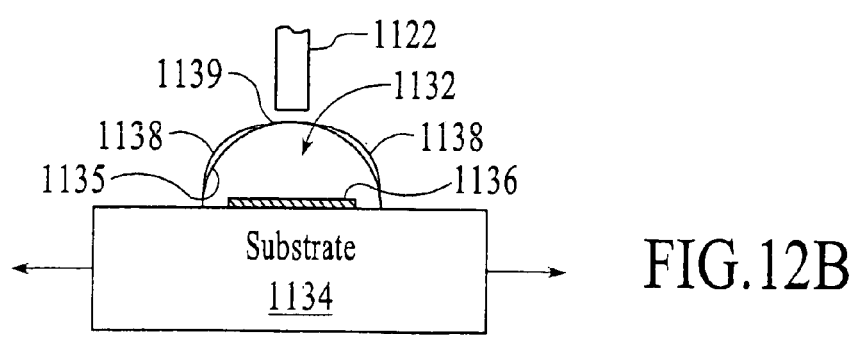
FIG. 12B illustrates a design for a electrical contact layer, under an embodiment of the invention.

FIG. 12B illustrates one of the electrical contact elements 1132 provided on the substrate 1134. In an embodiment such as shown by FIG. 11, the electrical contact elements 1132 is snap-dome contact, having an outer contact surface 1135 and an interior contact 1136. The outer contact surface 1135 may bend or curve outward over the interior contact 1136. The outer contact surface 1135 and the interior contact 1136 may form a switch that can be actuated. In the absence of an external force, the switch is in an open state. Contact by the corresponding actuation member 1122 causes the outer contact surface 1135 to collapse inward, thereby making contact with the interior contact 1136. When the stack is powered, this contact closes the switch formed by the outer contact surface and the interior contact 1136. The result is that the processor is signaled a "key-down" event that indicates insertion of the corresponding key structure 1108.

One advantage provided by the snap-dome construction is that the user is provided a tactile sensation when actuation occurs. This sensation is in the form of a "snap", felt with the collapse of the outer contact surface 1135. In the context of a mini-keyboard, the sensation informs the user that a key-down event was registered, so that the user can concentrate on viewing the key structures, and not the display of the mobile computing device.

FIG. 12B illustrates the contact element 1132 partially covered with a sheath layer 1138. The sheath layer 1138 is commonly used to enhance the tactile response that would otherwise be generated from the collapse of the outer contact surface 1135. Typically, the sheath layer 1138 is formed from a material such as MYLAR, which is semi-rigid but collapsible. The sheath layer 1138 is normally affixed over an entire surface of the outer contact area 1135. The actuation member 1122 may make contact with the sheath layer 1138 to cause the collapse of both the sheath layer and the outer contact surface 1135, thereby enhancing the snap response for the user.

In an embodiment shown by FIG. 12B, the sheath layer 1138 may include an opening 1139 to receive the corresponding actuation member 1122. In this way, the actuation member 1122 makes direct contact with the outer surface 1135, rather than with the sheath layer 1138. Less resistance is thus provided to the actuation member 1122 in making the snap-dome contact snap. However, the sheath layer 1138 may be affixed to the outer contact surface 1135 so that inward movement of that surface causes the sheath layer 1138 to further enhance the snap-sensation. Thus, the enhanced tactile sensation provided by the sheath layer 1138 may be preserved, while less resistance is given to the user inserting the corresponding key structures.

With regard to a stack assembly, each layer that forms the stack 1100 may be integrated into the stack at a specific tolerance level or margin of error. The tolerance of each layer in the stack assembly is tied together. Thus, the actuation members 1122 are always aligned to make contact and actuate the corresponding electrical contact 132. This is a direct result of assembling the stack as an independent unit. In embodiments in which the electrical contacts correspond to snap domes, the result of the tolerances in the layer of the stack being tied together is that the actuation members and domes remain perfectly aligned, ensuring both good electrical contact and tactile feedback.

Additionally, the tolerance for the integration of each layer in the stack may be cumulative, so that the overall tolerance of the stack 1100 is the sum, or at least the accumulation of the different tolerances. Furthermore, with regard to keyboard embodiments such as shown and described with FIGS. 1, 2A and 2B, the tolerance level of the stack as a whole may correspond to the order of the separation between key structures 120 in the horizontal sets 122.

Modular Stack Implementations

Figure 13A:
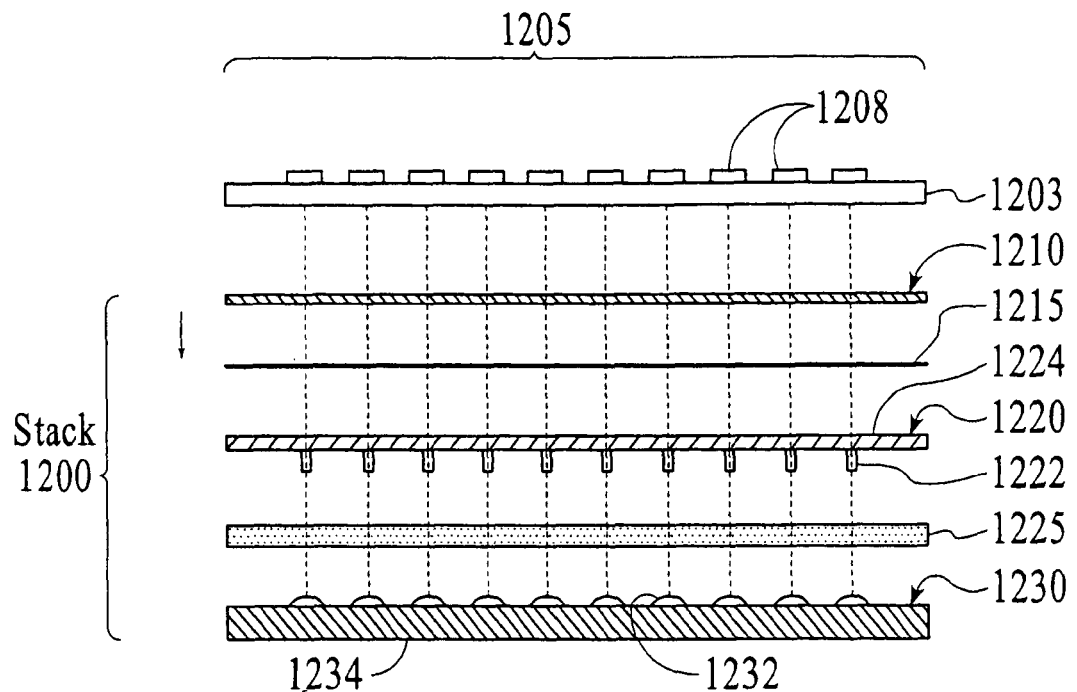
FIGS. 13A and 13B illustrate a stack formation, under an embodiment of the invention.
Figure 13B:
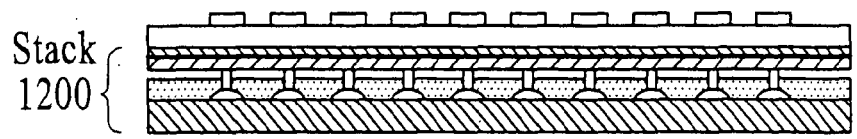

FIGS. 13A and 13B illustrate a stack formation, under an embodiment of the invention. In FIG. 13A an exploded view of a stack 1200 is illustrated. The exploded view illustrates the different elements that can be used to form an assembled and modular stack 1200. The stack 1200 may be placed underneath a keyboard 1205 comprising a plurality of key structures 1208. In the example provided, ten key structures 1208 are shown to simulate a row of a QWERTY keyboard.

In an embodiment shown by FIG. 13A, stack 1200 includes an illumination layer 1210 positioned proximate to the keyboard 1205, an actuation member layer 1220 provided underneath the illumination layer 1210, and an electrical contact layer 1230 provided underneath the actuation member layer 1220. FIGS. 11, 12A and 12B illustrate suitable constructions and implementations of the illumination layer 1210, actuation member layer 1220, and electrical contact layer 1230, under an embodiment. More specifically, actuation member layer 1220 may include a carrier 1224 on which a plurality of actuation members 1222 are provided. The electrical contact layer 1230 may include a substrate 1234 having a plurality of electrical contact elements 1232. As with previous embodiments, one type of electrical contact elements 1232 that can be employed are "snap-dome" contact elements. Additional information for construction and formation of the actuation member layer 1220 is provided with FIG. 16 and FIG. 17A-17E.

In an embodiment, the illumination layer 1210, the actuation member layer 1220, and the electrical contact layer 1230 are aligned and affixed to one another. According to an embodiment, a thin adhesive layer 1215 affixes the actuation member layer 1220 to the illumination layer 1210, and a thick adhesive layer 1225 affixes the actuation member layer 1220 to the electrical contact layer 1230. In one implementation, the thin adhesive layer 1215 is adhesive tape or film, such as VHB type adhesives manufactured by 3M. A thickness of the thin adhesive layer may range between 0.025 mm and 0.2 mm, and more preferably between 0.05 mm and 0.1 mm. In an embodiment, the thick adhesive layer 1225 may be positioned on the perimeter of the substrate 1134 and/or actuation member layer 1220, so as to not contact any of the contact elements 1232 or actuation members 1222. A suitable thickness for the thick adhesive layer 1225 may range between 0.3 mm and 1.0 mm, and more preferably at about 0.8 mm. A suitable type of adhesive for this layer may be open cell foam adhesive, such as high-density open cell urethane foam with acrylic adhesive manufactured by 3M.

In one embodiment, the illumination layer 1210 is formed from EL material. Placement of the illumination layer 1210 directly underneath the key structures 1208 permits maximum light output through the keypad 1205 and individual key structures 1208. In one implementation, the key structures 1208 may be formed from translucent or clear material, so as to act as light pipes that emit light from the illumination layer 1210.

FIG. 13B is a side cross-sectional view that illustrates the placement of the assembled stack 1200 within a housing 1203 of a mobile computing device. Each layer that forms the stack 1200 is affixed to the adjacent layers. The thick adhesive layer 1225 may circumvent an interior region where the actuation members 1222 are positioned in contact or just above the electrical contact elements 1232. The alignment of layers that comprise the stack 1200 may be rigidly maintained, while the key structures 1208 have limited lateral movement over the stack 1200. In one embodiment, stack 1200 is employed with the keypad 1205 floating over it. The keypad may include a carrier formed from a flexible membrane, such as an elastomer (e.g. silicon rubber). The key structures 1208 may be molded onto the carrier of the key structures, and positioned within the housing to float over the stack 1200. The floating keypad 1205 means that individual key structures 1208 have ability to move laterally, such as when contact by the finger or stylus of the user is received. The carrier of the key structures may extend just under the housing 1203, and each key structure 1208 may extend from the housing through a corresponding opening or aperture, so that insertion of the key structure into the aperture causes the corresponding actuation member 1222 to inwardly travel and actuate the corresponding electrical contact element 1232.

Figure 14A:
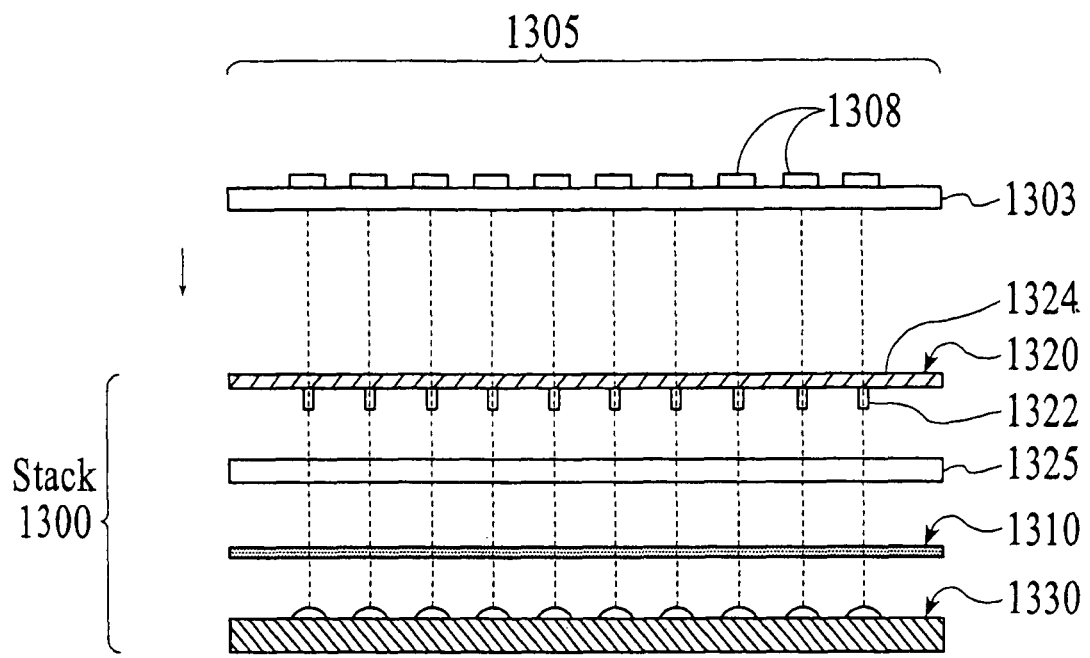
FIGS. 14A and 14B illustrate an alternative design for a stack, under an embodiment of the invention.
Figure 14B:
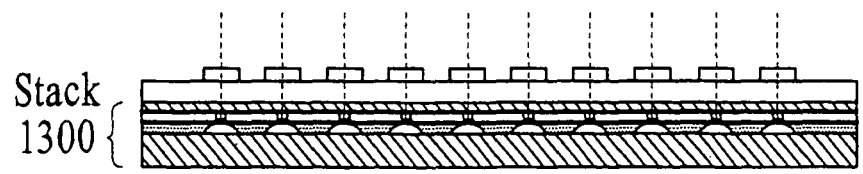

FIGS. 14A and 14B illustrate an alternative design for a stack 1300, under an embodiment of the invention. As with previous embodiments, stack 1300 includes an illumination layer 1310, an actuation member layer 1320, and an electrical contact layer 1330. However, the respective layers are ordered differently than compared to some of the other embodiments described herein. In an embodiment such as shown by FIG. 14A, the illumination layer 1310 is positioned to overlay the electrical contact layer 1330. The illumination layer 1310 and the electrical contact layer 1330 may be separately attached using adhesives. The actuation member layer 1320 is positioned over the illumination layer 1310 and proximate to the housing 1203. In order to enable keypad 1305 to be illuminated from the illumination layer 1310, an embodiment forms at least a carrier 1324 of the actuation member layer 1320 from translucent, clear, or semi-clear (e.g. white translucent) material that illuminates with light. A thick adhesive layer 1325 may affix the actuation member layer 1320 to the combined illumination layer 1310 and electrical contact layer 1330.

In one embodiment, the illumination layer 1310 is formed from EL material. By overlaying the electrical contact layer 1330, the illumination layer 1310 may make contact with discrete points on a substrate 1334 of the electrical contact layer 1330, as well as with portions of at least some of the contact elements 1332. In an embodiment such as shown with FIG. 12B, where the contact-elements 1332 are snap-domes, the illumination layer 1310 may overlay and contact the sheath layer 1138 (FIG. 12B). The actuation members 1322 may push against the illumination layer 1310 in order to cause the snap-dome contact element to switch. It is possible for an opening in the illumination layer 1330 to be provided in alignment with the opening 1139 (FIG. 12B) of the sheath layer 1138 in order to accommodate the corresponding actuation member 1222.

FIG. 14B illustrates the assembled stack 1300, placed within a housing 1303 of a mobile computing device. The stack 1300 may be tightly aligned and formed as a separate component for the mobile computing device. As with an embodiment of FIGS. 13A and 13B, a keypad 1305 may be formed from its own combination of a carrier and key structures 1308. The carrier of the key structures may extend under the housing 1303 of the mobile computing device. The key structures 1308 may be molded, joined or otherwise formed on the carrier and extended over the housing 1303. The keypad 1305 may float over the stack 1300, with the openings in the housing 1303 acting as insertion guides for each key structure 1308 when it is inserted. As described elsewhere, each key structure 1308 may align with a corresponding actuation member 1322 and a corresponding contact element 1332.

Even with use of a translucent material for the carrier 1324 of the actuation member layer 1320, the placement of the illumination layer 1310 directly over the contact element layer 1230 reduces the amount of lighting emitted for the keypad 1305, when compared to an embodiment such as shown by FIGS. 13A and 13B. However, combining the illumination layer 1310 with the electrical contact layer 1330 enables the combined layers to be readily integrated with the actuation member layer 320. Precise alignment and assembly is required only for the combined layer, the adhesive layer 1325, and the actuation member layer 1320. Assembly requirements are thus reduced, enabling the stack 1300 to be made with less expense and effort.

Figure 15A:
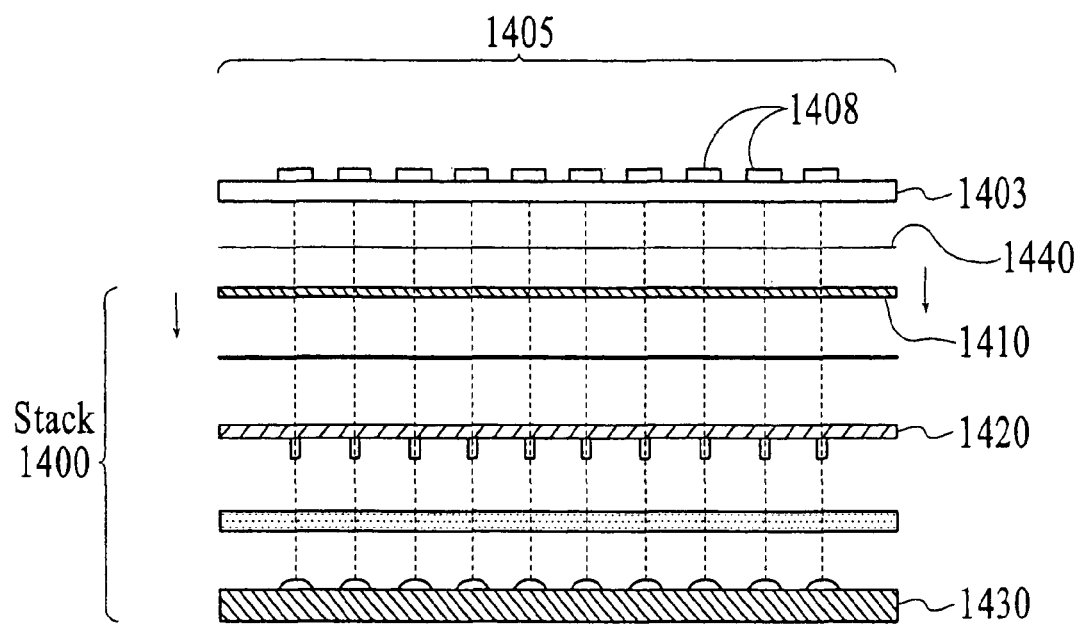
FIGS. 15A and 15B illustrate an alternative construction in which a mask is combined with an illumination layer 410 as part of a stack formation, under an embodiment of the invention.
Figure 15B:
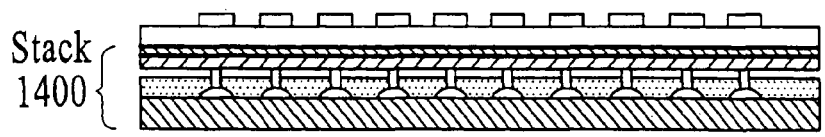

FIGS. 15A and 15B illustrate an alternative construction in which a mask 440 is combined with an illumination layer 1410 within a stack 1400. FIG. 15A is an exploded view of a stack design similar to an embodiment shown with FIGS. 13A and 13B. The stack 1400 includes an illumination layer 1410 placed over an actuation member layer 1420. The actuation member layer 1420 may be placed over the electrical contact layer 1430. However, in contrast to an embodiment such as described with FIGS. 13A and 13B, the mask 440 is superimposed on the illumination layer 1410 just underneath a housing 1403 of the mobile computing device. An example of how mask 1440 can be constructed is shown with FIG. 16. The mask 1440 serves to shade or block light from being emitted from diffusing. Rather, light may be focused to emit only from translucent key structures 1408, or from space in the opening of the hosing where that key structure is provided. The result is that the lighting provides better contrast for regions that are desired to be lit, and less light to regions where the lighting is a distraction.

It is possible for an embodiment to use mask 1440 with an illumination layer that is combined or overlaid with the electrical contact layer, as described with embodiments of FIGS. 14A and 14B. However, in an embodiment where there is an intervening layer (e.g. actuation member layer 1320 in FIG. 14A and FIG. 14B), the effectiveness of using the mask 1440 is reduced.

FIG. 16 is a frontal view of the different layers and elements that can be used to integrally form a modular stack 1500, under an embodiment. An embodiment shown assumes the stack 1500 is for use with a thirty key keypad, such as found with many small-form factor computing devices using QWERTY keyboard layouts. More or fewer keys, and different keyboard configurations may be used to take advantage of the modular stack 1500. For example, the stack 1500 may accommodate 9-12 keys for a standard numerical keypad found on the typical cell phone. For purpose of description, an order or arrangement as shown and described by an embodiment of FIGS. 15A and 15B is assumed when describing embodiments of FIG. 16.

In an embodiment shown, a stack may be assembled to include an illumination layer 1510, an actuation member 1520, a thick adhesive layer 1525, an electrical contact layer 1530, and a mask 1540. As described with other embodiments, the illumination layer 1510 may be formed from EL material. Alternatively, the illumination layer 1510 may be formed from discrete light sources, such as LEDs or other forms of light emitting mechanisms.

The actuation member layer 1520 may comprise the carrier 1524 and a plurality of actuation members 1522 that extend away from the key structures in use. The carrier 1524 may be designed for maximum flexibility, while the actuation members 1522 may be structured to be rigid. To this end, the carrier 1524 may be formed from a flexible material and be provided slits 526 about individual actuation members 1522 in order to facilitate those actuation members to travel inward more freely. The particular slit configuration shown in FIG. 16 is of design choice, and alternative slit patterns may be employed. For example, L-shaped corner slits about each action member 1522 may be used about rather than connected lines that partially circumvent each actuation member.

The adhesive layer 1525 may correspond to a perimeter layer that surface mounts to the electrical contact layer 1530 and/or the actuation member layer 1520. The electrical contact layer 1530 may employ snap-dome contact elements for tactile response, as described above. However, other forms of contact elements may also be used, including contact diaphragms and tabs.

In one embodiment, mask layer 1540 is formed from a material that blocks the transmission of light. When placed over the illumination layer, light focuses and escapes from cut-outs 1542 formed in the mask layer 1540. The cut-outs 1542 may be shaped to accommodate the shape of the desired illumination. In the case where translucent key structures are employed so that the key structures themselves are illuminated, the shape of the cut-outs may correspond to the shape of the key structures. For example, in FIG. 16, the cut-outs 1542 are rectangular in shape to accommodate similarly shaped key structures.

Actuation Member Layer Design and Formation

Various actuation member layers designs and formation techniques may be used to create a carrier on which actuation members may extend. In one embodiment, the carrier of the actuation member may be formed from a film (using polycarbonate or similar material) that is overlaid with silicon-rubber. The silicon-rubber may be shaped to have protrusions in the form of actuation members. The silicon rubber may be molded onto the film and designed to have a minimal thickness in regions other than where the actuation members are formed. The actuation members may extend a length (0.5 mm in one implementation) from the carrier so as to be able to actuate a corresponding contact element with insertion of the key structure. Once the actuation members are formed, the carrier may be die or laser-cut to have a slit pattern that makes the carrier less resistant to movement of the actuation members.

FIGS. 17A-17E illustrate another technique for forming an actuation member layer, under another embodiment of the invention. In FIG. 17A, a film 1702 is created of a desired dimension and shape. The film 1702 may be translucent, and/or colored, white, milky white (via print or ink) or clear. The film 1702 may be formed from a flexible material, such as silicon-rubber. In FIG. 17B, holes 1712 or fie cut or otherwise formed in the film 1702. The holes 1712 are positioned where the actuation members are to subsequently be formed. The holes 1712 subsequently act as gates for an injection mold that will form the actuation members.

In FIG. 17C, a plurality of actuator members 1716 are molded through the film 1702. The material used to form the actuation member 1716 is formed from a semi-rigid or rigid material, such as hard plastic. Due to the small dimension of the actuation member 1716, conventional molding techniques may be unreliable for securely forming and maintaining the actuation member on the film. FIG. 17D illustrates a molding technique for forming the actuation members 1716 more securely and reliably. The actuation member 1716 may extend out of the underside 1722 of the film 1702, while the actuation member is gated from the topside 1724 of the film. Thus, material used to form the actuation member 1716 is injected through the holes 1712, using a molding medium angled with the topside 1724. FIG. 17D illustrates two possible gate positions for the injection mold. A vertical gate 1736 may use a runner oriented vertically with the hole 1714 to pass the injection mold onto the underside 1722. An edge gate 1738 may use a runner oriented at an angle to an edge of the hole 1714.

FIG. 17E shows that the film 1702 may be cut using, for example, die or laser-cutting, in a pattern that partially circumvents the individual actuation members 1716. A resulting slit-pattern 1732 enhances the flexibility of the film 1702 and reduces the resistance of the actuation members 1716 to movement.

In an alternative embodiment, the actuator member 1716 may be formed from a material such as hard plastic that is molded on the underside 1722 of the film 1702. As shown by FIG. 17F, the actuation member 1716 may be provided a gate on the underside that results in the actuation member 1716 being molded to have a base 1742 and an extension 1744. The base 1742 stabilizes the mold of the plastic, while the extension provides the narrow dimension needed for the contact element. Temperature-sensitive adhesive may be spot-placed on the film at locations where the actuation members are to be extended to assist adhesion of the molding onto the film. The adhesion of the adhesive may be triggered when hot mold for the plastic is placed on the film.

Mobile Computing Device Implementation

Figure 18:
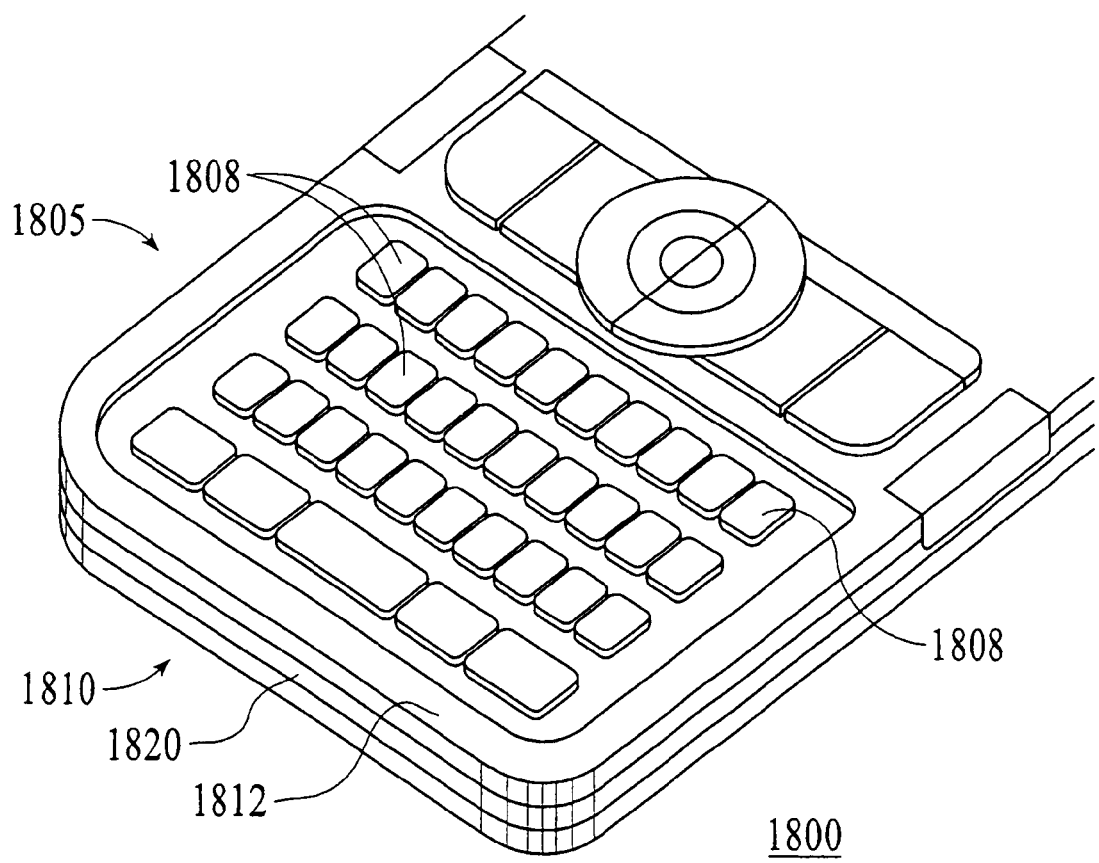
FIG. 18 illustrates an embodiment of the invention implemented within a mobile computing device having a first keyboard design.

FIG. 18 illustrates an embodiment of the invention implemented within a mobile computing device 1800. The mobile computing device 1800 includes a housing 1810 from which a keyboard 1805 is provided. Individual key structures 1808 comprising the keyboard 1805 may be arranged on a front panel 1812 of the housing 1810. The mobile computing device 1800 may employ a QWERTY style keyboard, having at least one key structure for every letter in the alphabet, with additional key structures for spacing and special characters. As such, the keyboard 1805 may include over thirty key structures 1808, including three rows of key structures having ten keys each.

A stack 1820 (shown in phantom) may be maintained within the housing. The stack 1820 may be formed according to an embodiment such as described above. As described, stack 1820 may include individual actuation members 1808 separately formed from the key structures that are responsive to a particular key structure traveling inward into the housing 810. In one embodiment, the stack 1800 is integrally combined using techniques such as described with FIGS. 13A, 13B, 14A, 14B, 15A, and 15B. The formation of the stack 1820 may occur before the mobile computing device 1800 or its keyboard 1805 are assembled. As such, the stack 1820 may be a modular component that can be inserted into the housing 1810 and made to operatively engage the key structures 1808.

Figure 19:
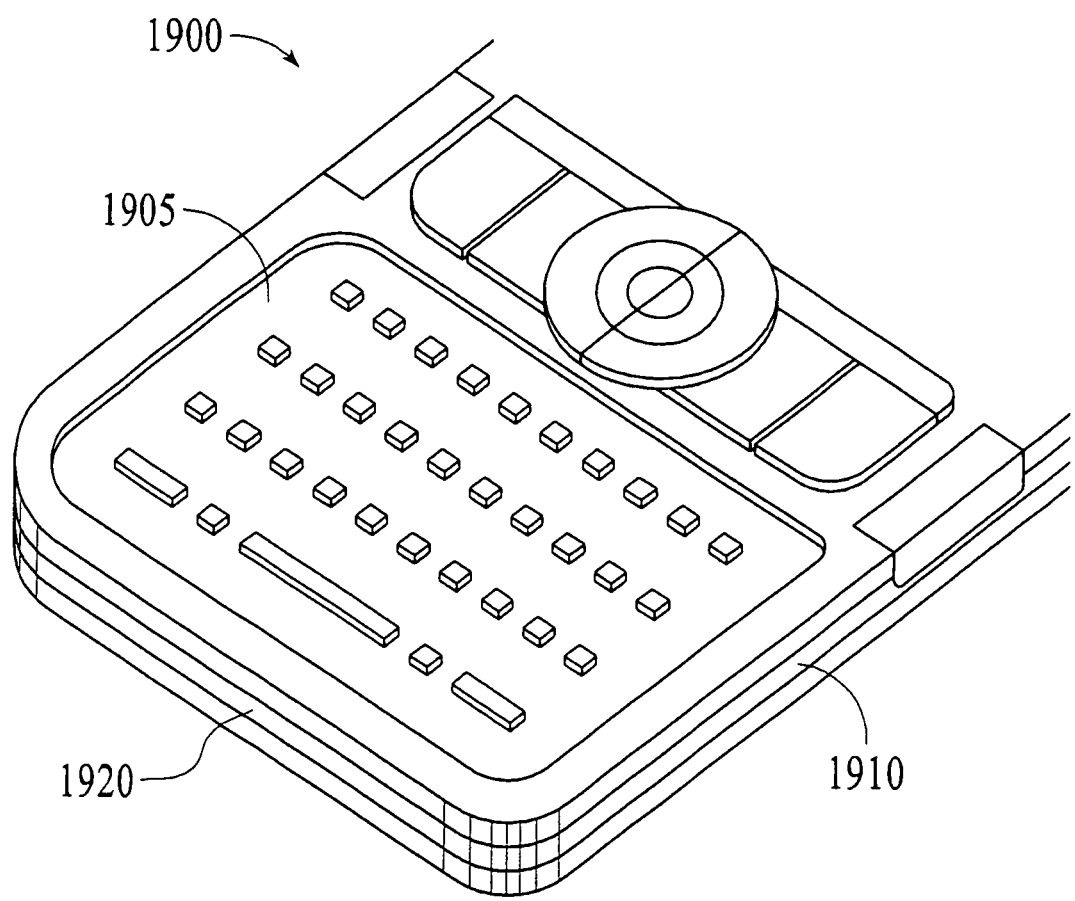
FIG. 19 illustrates an embodiment of the invention implemented within a mobile computing device having a second keyboard design.

In FIG. 18, the keyboard design is to closely space key structures 1808 that extend in the row-wise direction. FIG. 19 illustrates a different implementation of a mobile computing device 1900 in which a stack 1920 is provided, according to an embodiment of the invention. A keyboard layout of the mobile computing device 1900 provides individual key structures that are spaced both row-wise and vertically. Despite the variation in key structure spacing, stack 1920 may have similar design and dimensions as the stack 1820 shown in FIG. 18. The modularity of the stack design enables the use of similar designs in different keyboard layouts, as the case may be.

Number Assignment Technique

Mobile computing devices that incorporate cellular phone functionality and keyboards for entering text (e.g. for use in messaging applications) generally have a need to assign both numeric and character values to individual keys. Both types of characters need to be readily available to the user. For example, if the user wishes to make a phone call, the user will want to have key strikes recognized as numbers, not character entries.

With keyboards becoming small, the size of individual keys has also become smaller. For applications that require numeric entry (e.g. phone application), small key size leads to larger entry errors. This problem is particularly apparent with numeric keys since users typically operate mobile computing devices as cell phones using one hand.

Embodiments of the invention provide a number assignment technique to enhance the user's ability to enter numbers, particularly in the context of using a phone application on a smart phone or other mobile computing device. In an embodiment, a mobile computing device includes a keypad that is operatively connected to processing resources of the device. The mobile computing device may be equipped with a keyboard (e.g. with a QWERTY layout) having a plurality of keys or key structures. The keys provided may be identified in two sets: (i) a first includes keys that are individually actuatable to register a corresponding non-numeric character entry, (ii) a second set of the plurality of key structures are individually actuatable to register with the one or more processors a corresponding numerical entry. While it is possible for the first or second set of keys to have complete overlap with the other set, an embodiment contemplates that some, but not all of the keys in the first set and the second set have overlap. The second set of keys includes a plurality of key pairs, and each key pair each includes a first key and a second structure. According to an embodiment, the mobile computing device registers either of (i) actuation of the first key structure in a given key structure pair of the second set, (ii) actuation of the second key structure of the given key structure pair, and (iii) actuation of first key structure and the second key structure of the given key structure pair, to be of a single numerical value.

Figure 20:
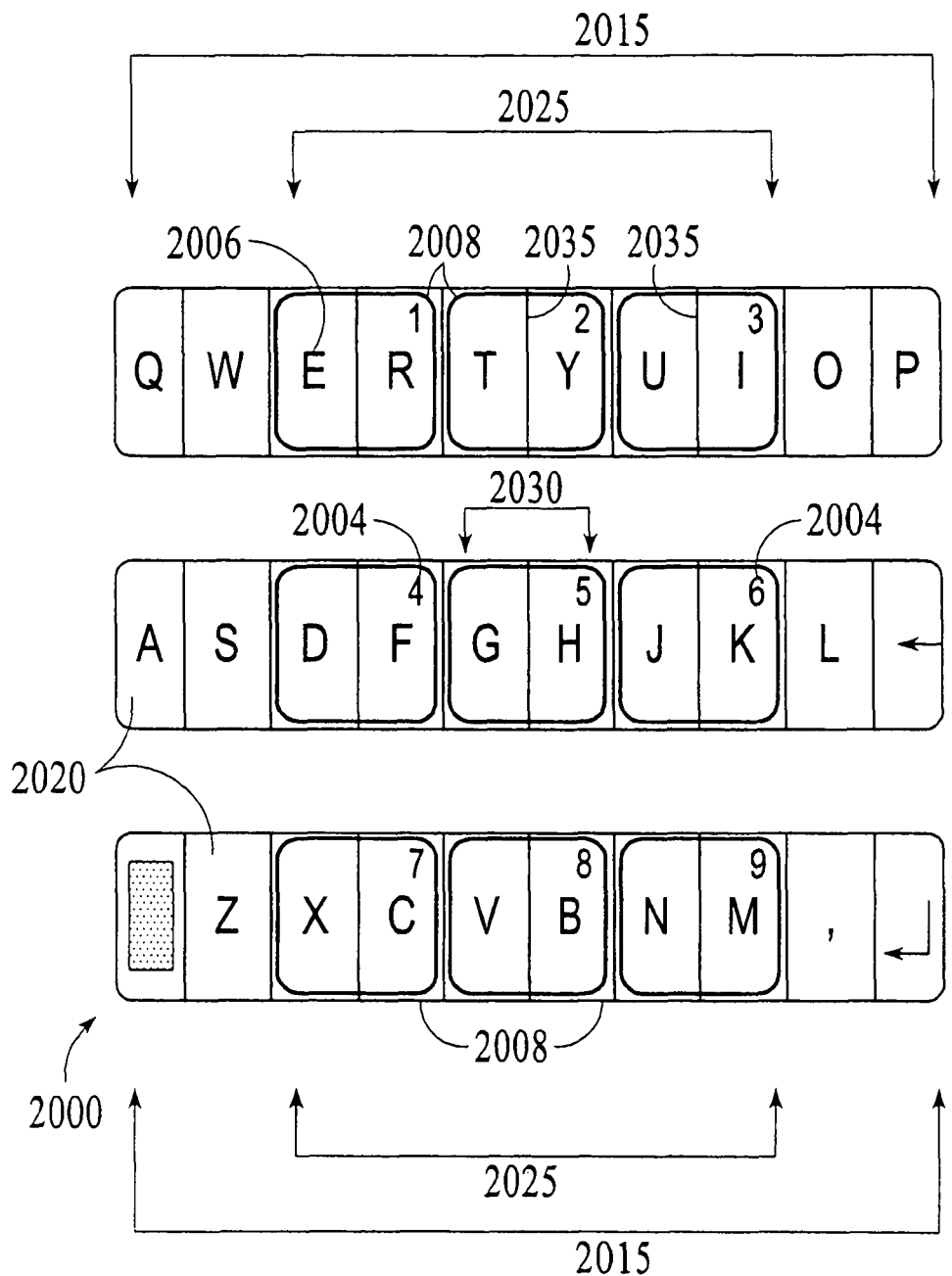
FIG. 20 illustrates a keyboard configured for implementation with a number assignment technique, according to an embodiment of the invention.

FIG. 20 illustrates a keyboard configured for implementation with a number assignment technique, according to an embodiment of the invention. A keyboard 2000 includes a plurality of key structures 2020 having both numeric marking 2004 and non-numeric markings 2006. A first set of key structures 2015 includes all of the key structures displayed. A second set of key structures 2025 is delineated by shading. Each key structure 2020 in the second set 2025 is paired with another key structure of that set to form a key structure pair 2030. According to one embodiment, a pair marking 2008 circumvents each key structure pair 2030 in the second set 2025.

The keyboard 2000 may be operated in either numeric or non-numeric mode. In numeric mode, each key structure pair 2030 in the second set 2025 is assigned to a single number. If either key structure in any given key structure pair 2030 is struck, the mobile computing device interprets the key strike as the single number. Furthermore, an embodiment provides that if both key structures in the same key structure pair 2030 are struck at the same time, then the mobile device also recognizes that same single input. For example, with reference to FIG. 20, the following key strikes (identified by non-numeric markings 2006) result in the following input being registered when the mobile computing device is operated in numeric mode:

| Key Strike | Input Registered |
|---|---|
| D R G | 4 1 5 |
| G H H | 5 5 5 |
| E (TY) R T | 1 2 1 2 |

The use of parenthesis in the above example are intended to illustrate the case of a simultaneous key strike.

An embodiment such as described in FIG. 20 recognizes that when a mobile computing device is operated in a numeric mode, fewer key structures will be required. The designation of key structures for use in key structure pairs 2030 provides a mechanism to increase the amount of key space needed by a user to register a single numeric input. In this way, the keyboard is more number friendly when used with the phone application or other numeric applications.

The marking pattern used on a mobile computing device facilitate usage of the mobile computing device in alternating numeric and non-numeric modes. As typical with small keyboards, the individual key structures are generally provided the non-numeric marking 2006 to indicate the value that will be registered by the mobile computing device when that key is struck, unless a mode is entered where the key structure is to correspond to another value. According to an embodiment, the numeric markings 2004 are treated differently. In one embodiment, the numeric markings 2004 are not provided on every key structure 2020 that can be struck to enter a numeric value. Rather, each numeric marking 2004 is assigned to an individual key structure pair 230 of the second set 225. Additionally, the pair marking 2008 identifies the key pairs 2030 to the user. In embodiment shown by FIG. 20, the pair markings 2008 form a perimeter about both the numeric marking 2004 and the non-numeric marking 2006. However, other forms of marking arrangements are possible to delineate key pairs, as well as their numeric and non-numeric values. For example, each key pair 230 may be provided a different color for the numeric marking 2004 or non-numeric marking 2006.

An embodiment such as described in FIG. 20 may be implemented with a keyboard such as described with FIGS. 1, 4A or elsewhere in this application. In particular, an embodiment may utilize tightly spaced keys to enhance the user's perception of key pair set 230. For example, in FIG. 20, pair markings 2008 are interrupted by separation lines 2035 of the key structures 230. However, since the separation lines 2035 are thin (such as the case where adjacent key structures are nearly abutting as described with FIG. 1), pair marking 2008 may, relatively speaking, be visually uninterrupted by the separation lines.

As shown in FIG. 20, not all number values require separate key structure pairs 230. For example, the number "0" requires just one individual key structure 2020 (see FIG. 22).

Figure 21:
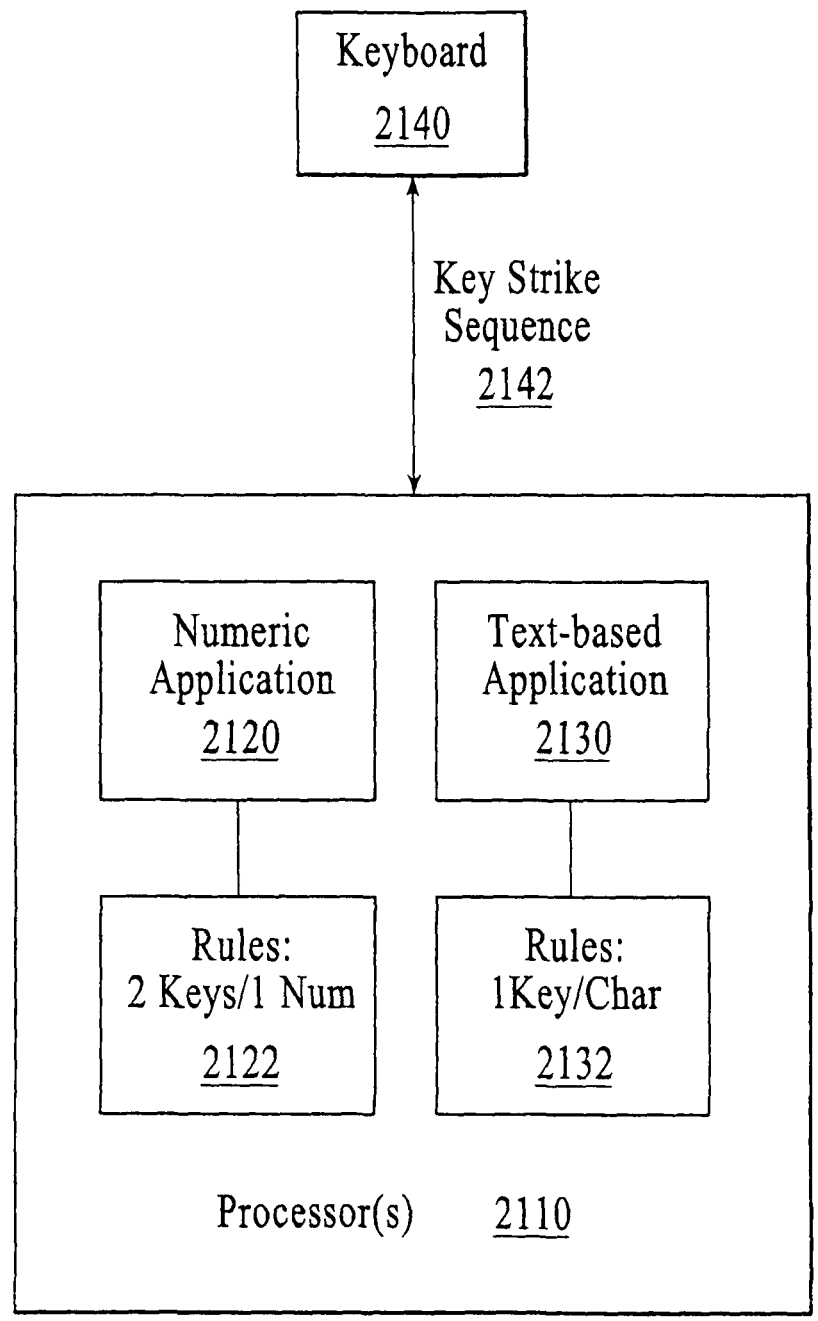
FIG. 21 illustrates a system in which keys or key structures can be paired (or clustered) to provide a single numeric value, or separate non-numeric values.

FIG. 21 illustrates a system in which keys or key structures can be paired (or clustered) to provide a single numeric value, or separate non-numeric values. A system includes one or more processors 2110 and a keyboard 2140, implemented within, for example, the confines of the housing of a mobile computing device. The processors 2110 may execute one or more numeric applications 2120 and one or more text-based applications 2130. An example of a numeric application 2120 includes a phone application or a calendar application. An example of a text-based application includes an email or document editing application.

The processor(s) 2110 may execute each of the applications with different sets of rules. Specifically, the numeric application A user may operate keyboard 2140 to enter a key strike sequence 2142. The rules for each application may govern how that application interprets the input. For example, if the numeric application 2120 is operating (the user opens phone application), a set of rules 2122 cause the processor 2110 to interpret the key strike sequence according to pair sets: designated pairs of keys have a single value. Key strikes that correspond to keys not in the set containing key strike pairs may be handled differently (e.g. they may be ignored). If the text-based application is operating (the user opens email application), a set of rules 2132 cause the processor 2110 to interpret the key strike sequence 2142 according to a rule where each key strike has an alphanumeric value.

FIG. 21 illustrates one mechanism for establishing the key structures having dual character/number assignments are to be interpreted for their numerical values. An embodiment such as described above provides that the numeric mode is established with the operation or execution of a numeric application (e.g. Phone or Calculator application). Other mechanisms may also be employed to establish a "number lock" on the set of keys that have number assignments. For example, the user may be able to enter an input that establishes a number lock, so that characters having dual assignments of numbers and characters are interpreted only as numbers. The number lock may even be established in a text-based application. For example, the user may enter the number lock when drafting an email for purpose of writing a phone number out.

Figure 22:
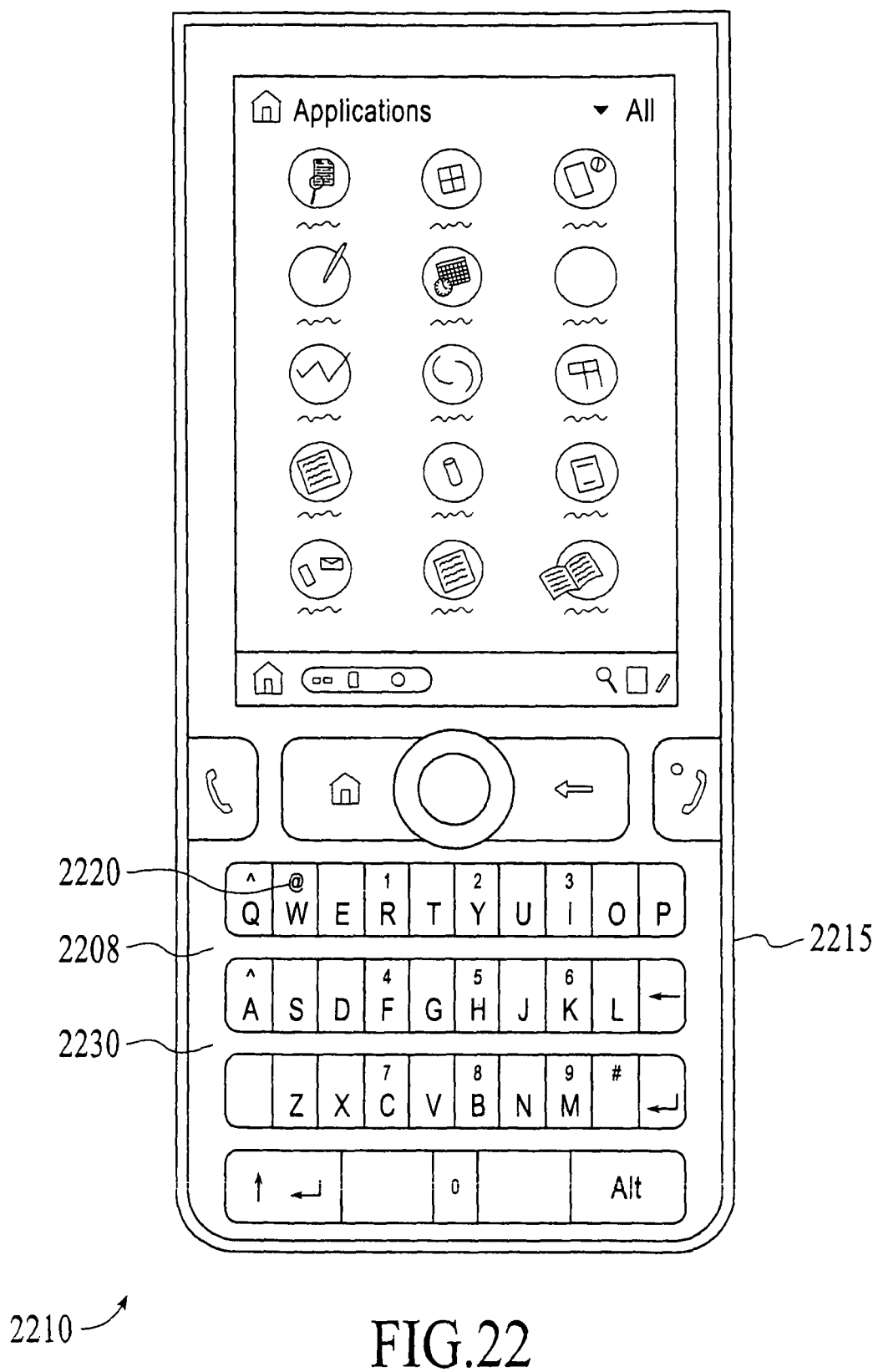
FIG. 22 illustrates a mobile computing device, configured with a key assignment scheme in accordance with an embodiment of the invention.

FIG. 22 illustrates a mobile computing device, configured with a key assignment scheme in accordance with an embodiment of the invention. In FIG. 22, a mobile computing device 2210 includes capabilities for messaging, cellular phone and voice and other applications. A keyboard 2215 includes key structures 2220 that are each assigned to a letter or character when text mode is employed. For numeric mode, the key pairs 2230 are identified using markings 2208. Each key pair 2230 includes its own number value. A key strike in a given key pair 2230 results in (i) a letter or character assigned to that specific key structure if the device 2210 is in text mode, or (ii) a number assigned to the key structure pair of that key structure if the device is in number mode.

Alternative Key Pair/Group Assignment Schemes

While an embodiment shown uses two key structures to form key structure pairs having one numerical assignment, other embodiments may utilize three or more key structures for single numeric assignments. For example, three key structures 220 may be assigned to one another.

Furthermore, the assignment of number values is just one application for pairing or grouping key structures. For example, a device may have a keyboard that can be operated to enter text and to enter input for gaming applications. Gaming applications normally require just a few buttons. In such an application, a cluster of keys (e.g. four) may be delineated to correspond to one gaming function (e.g. "Action"). The delineation may include use of markings that visually separate the cluster for the user, while also providing markings to show letters.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A mobile computing device comprising:
   a housing;
   one or more processors contained within the housing, wherein the one or more processors operates the mobile computing device in either a first mode or a second mode;
   a keypad coupled to the one or more processors and having a first set of keys and a second set of keys, the first set and the second set including at least some of the same keys, wherein the second set comprises a plurality of key pairs, each key pair including a first key and a second key, each key pair corresponding to a numeric character entry;
   wherein when the one or more processors operates the mobile computing device in the first mode, the one or more processors register actuation of each individual key of the first set as a non-numeric character entry corresponding to the individual key, the corresponding non-numeric character entry for each individual key being different from the corresponding non-numeric character entry for each of the other keys;
   wherein when the one or more processors operates the mobile computing device in the second mode, the one or more processors registers, for each key pair, (i) individual actuation of the first key of that key pair, (ii) individual actuation of the second key of that key pair, and (iii) concurrent actuation of the first and second key of that key pair, as the corresponding numeric character entry of that key pair, the corresponding numeric character entry being different for each of the other key pairs; and
   wherein the one or more processors ignore actuation of any keys that are not in the second set when the one or more processors operate in the second mode.

2. The mobile computing device of claim 1, wherein the second set of keys is arranged in a dial pad configuration, with each key pair corresponding to a number of the dial pad configuration.

3. The mobile computing device of claim 2, wherein each key pair further includes a pair marking indicating that the one or more processors registers (i) individual actuation of the first key, (ii) individual actuation of the second key, and (iii) concurrent actuation of the first and second key, as the corresponding numeric character entry when the one or more processors operates the mobile computing device in the second mode.

4. The mobile computing device of claim 3, wherein the pair marking of a given key pair corresponds to a perimeter formed on each of the keys in that key pair.

5. The mobile computing device of claim 3, wherein, for each key pair, either (i) the first key, (ii) the second key, or (iii) both the first and second keys, includes a marking displaying the corresponding numeric character entry of that key pair.

6. The mobile computing device of claim 5, wherein each key in each of the key pairs includes a marking displaying the corresponding non-numeric character entry for that key.

7. The mobile computing device of claim 1, wherein each key in the second set includes a footprint that is obling and symmetrical about a length of that key.

8. The mobile computing device of claim 1, wherein the first key and the second key of a given key pair nearly abut one another.

9. The mobile computing device of claim 8, wherein the plurality of keys form three rows, each row having at least one key pair, and wherein, for each of the key pairs, the first and second keys are horizontally aligned.

10. The mobile computing device of claim 9, wherein the one or more processors operates the mobile computing device in the second mode automatically when an application using the numeric character entry is operated on the mobile computing device.

11. The mobile computing device of claim 10, wherein the application corresponds to a phone application for enabling the mobile computing device to be used as a phone.

12. A keypad for a mobile computing device, coupled to one or more processors, and comprising:
    a plurality of key pairs, each key pair including:
    a first key, wherein user interaction with the first key registers a first input with the one or more processors when the mobile computing device is operated in a first mode, and user interaction with the first key registers a second input with the one or more processors when the mobile computing device is operated in a second mode,
    a second key, wherein user interaction with the second key registers the same second input as the first key with one or more processors when the mobile computing device is operated in the second mode, and user interaction with the second key registers a third input, different from the first input, with one or more processors when the mobile computing device is operated in the first mode, and
    wherein concurrent user interaction with the first and second key registers the same second input as each of the first and second keys with the one or more processors when one or more processors of the mobile computing device is operated in the second mode;
    wherein the first input and third input correspond to non-numeric entries, and the second input corresponds to a numeric entry.

13. The keypad of claim 12, wherein each key pair includes a marking identifying the first key and second key of that key pair.

14. The keypad of claim 12, further comprising a set of keys not associated with the plurality of key pairs, and wherein the one or more processors ignores user interaction with the set of keys not associated with the plurality of key pairs when the mobile device is operated in the second mode.

15. The keypad of claim 12, wherein the first input and the third input for each key pair is unique from (i) the other first inputs of the other key pairs and (ii) the other third inputs of the other key pairs.

16. The mobile computing device of claim 12, wherein for each key pair, the first key includes a marking displaying the first input for that first key, and the second key includes a marking displaying the third input on that second key.

* * * * *

UNITED STATES PATENT AND TRADEMARK OFFICE
CERTIFICATE OF CORRECTION

| | |
|---|---|
| PATENT NO. | : 8,525,794 B2 |
| APPLICATION NO. | : 12/395535 |
| DATED | : September 3, 2013 |
| INVENTOR(S) | : Peter Skillman |

It is certified that error appears in the above-identified patent and that said Letters Patent is hereby corrected as shown below:

In the Specification

In column 2, line 1, delete "FIG. 3A" and insert -- FIG. 3B --, therefor.

In the Claims

In column 28, line 9, in Claim 7, delete "obling" and insert -- oblong --, therefor.

Signed and Sealed this
Twelfth Day of November, 2013

Teresa Stanek Rea
*Deputy Director of the United States Patent and Trademark Office*